US 7,922,582 B2

(12) United States Patent
Miyamoto et al.

(10) Patent No.: US 7,922,582 B2
(45) Date of Patent: Apr. 12, 2011

(54) HAND-HELD GAME APPARATUS AND GAME PROGRAM

(75) Inventors: Shigeru Miyamoto, Kyoto (JP); Katsuya Eguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 12/127,923

(22) Filed: May 28, 2008

(65) Prior Publication Data

US 2009/0143138 A1    Jun. 4, 2009

Related U.S. Application Data

(63) Continuation of application No. 10/837,650, filed on May 4, 2004.

(30) Foreign Application Priority Data

Dec. 10, 2003   (JP) .................................. 2003-412582

(51) Int. Cl.
*A63F 9/24* (2006.01)
*A63F 13/00* (2006.01)
*G06F 17/00* (2006.01)
*G06F 19/00* (2006.01)

(52) U.S. Cl. ................ 463/30; 463/31; 463/36; 463/37; 463/38; 463/43; 463/44

(58) Field of Classification Search .............. 463/30, 463/31, 36–38, 43, 44
See application file for complete search history.

(56) References Cited

U.S. PATENT DOCUMENTS

| 4,360,831 | A |   | 11/1982 | Kellar |
|---|---|---|---|---|
| 4,445,144 | A | * | 4/1984 | Giddings .................. 348/96 |
| 4,542,903 | A |   | 9/1985 | Yokoi |
| 4,600,200 | A |   | 7/1986 | Oka et al. |
| 4,631,691 | A |   | 12/1986 | Pica |
| 4,646,075 | A |   | 2/1987 | Andrews et al. |
| 4,692,756 | A |   | 9/1987 | Clark |
| 4,727,365 | A |   | 2/1988 | Bunker et al. |

(Continued)

FOREIGN PATENT DOCUMENTS

JP    58-116377    11/1983

(Continued)

OTHER PUBLICATIONS

Office Action dated Dec. 16, 2010 in related U.S. Appl. No. 12/398,790.

*Primary Examiner* — David L Lewis
*Assistant Examiner* — Adetokunbo Torimiro
(74) *Attorney, Agent, or Firm* — Nixon & Vanderhye P.C.

(57) ABSTRACT

A hand-held game apparatus and a game program allow a user to play a game while going back and forth between a narrow-range map and a broad-range map. The player can manipulate a touch panel mounted on a display for displaying the broad-range map. If the player manipulates the touch panel to point to a coordinate position on the broad-range map, thus designating coordinates for a narrow-range map to display, an image of the narrow-range map, which is changed as desired, is displayed. If the player indicates a moving direction on the broad-range map, to designate a scroll direction, the displayed broad-range map is moved (scrolled).

8 Claims, 15 Drawing Sheets

U.S. PATENT DOCUMENTS

| | | | |
|---|---|---|---|
| 5,276,785 A | | 1/1994 | Mackinlay et al. |
| 5,359,703 A | | 10/1994 | Robertson et al. |
| 5,414,444 A | | 5/1995 | Britz |
| 5,422,989 A | | 6/1995 | Bell et al. |
| 5,560,614 A | * | 10/1996 | Ueda et al. .................. 463/31 |
| 5,608,850 A | | 3/1997 | Robertson |
| 5,689,628 A | | 11/1997 | Robertson |
| 5,808,613 A | | 9/1998 | Marrin et al. |
| 5,949,643 A | | 9/1999 | Batio |
| 6,081,207 A | | 6/2000 | Batio |
| 6,252,602 B1 | * | 6/2001 | Matsuda et al. ............. 345/589 |
| 6,346,938 B1 | | 2/2002 | Chan et al. |
| 6,540,614 B1 | | 4/2003 | Nishino et al. |
| 6,667,877 B2 | | 12/2003 | Duquette |
| 2002/0111216 A1 | | 8/2002 | Himoto et al. |

FOREIGN PATENT DOCUMENTS

| | | | |
|---|---|---|---|
| JP | 4-369027 | | 12/1992 |
| JP | 6-285259 | | 10/1994 |
| JP | 7-294892 | | 11/1995 |
| JP | 07294892 A | * | 11/1995 |
| JP | 2002-325963 | | 11/2002 |

* cited by examiner

F I G. 3
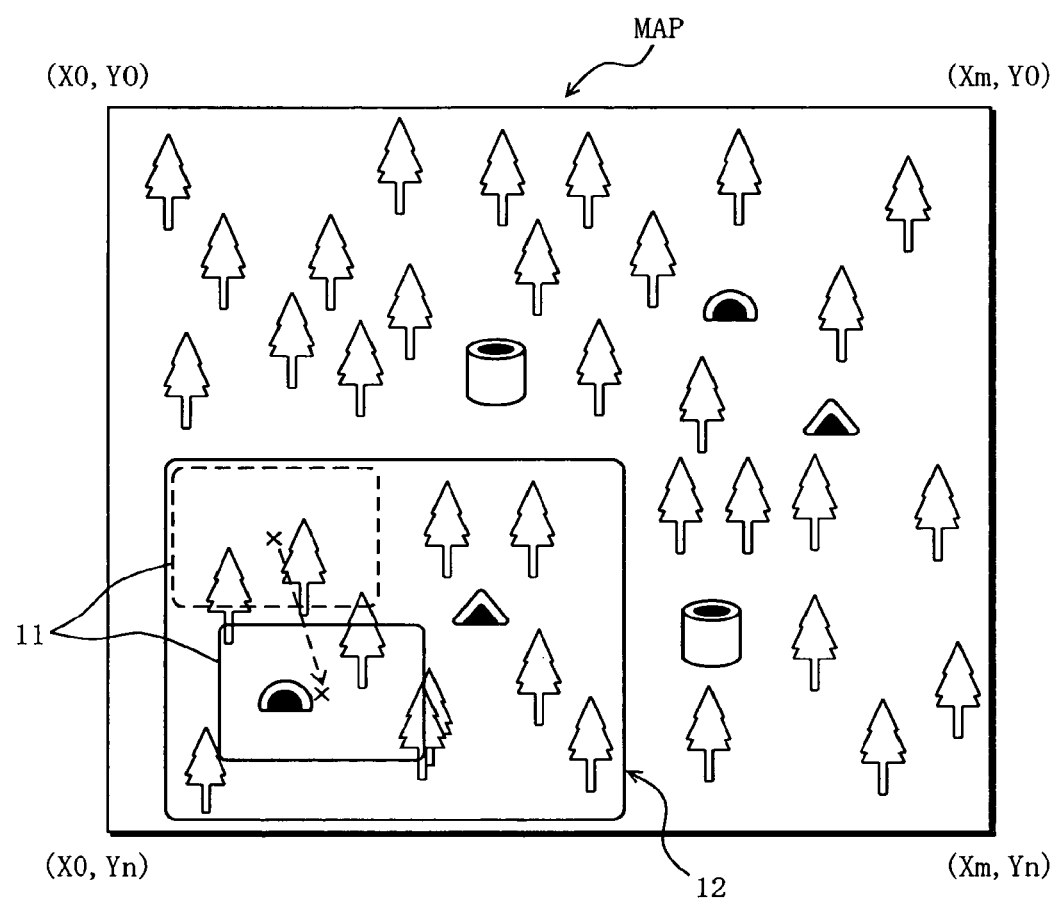

F I G. 4
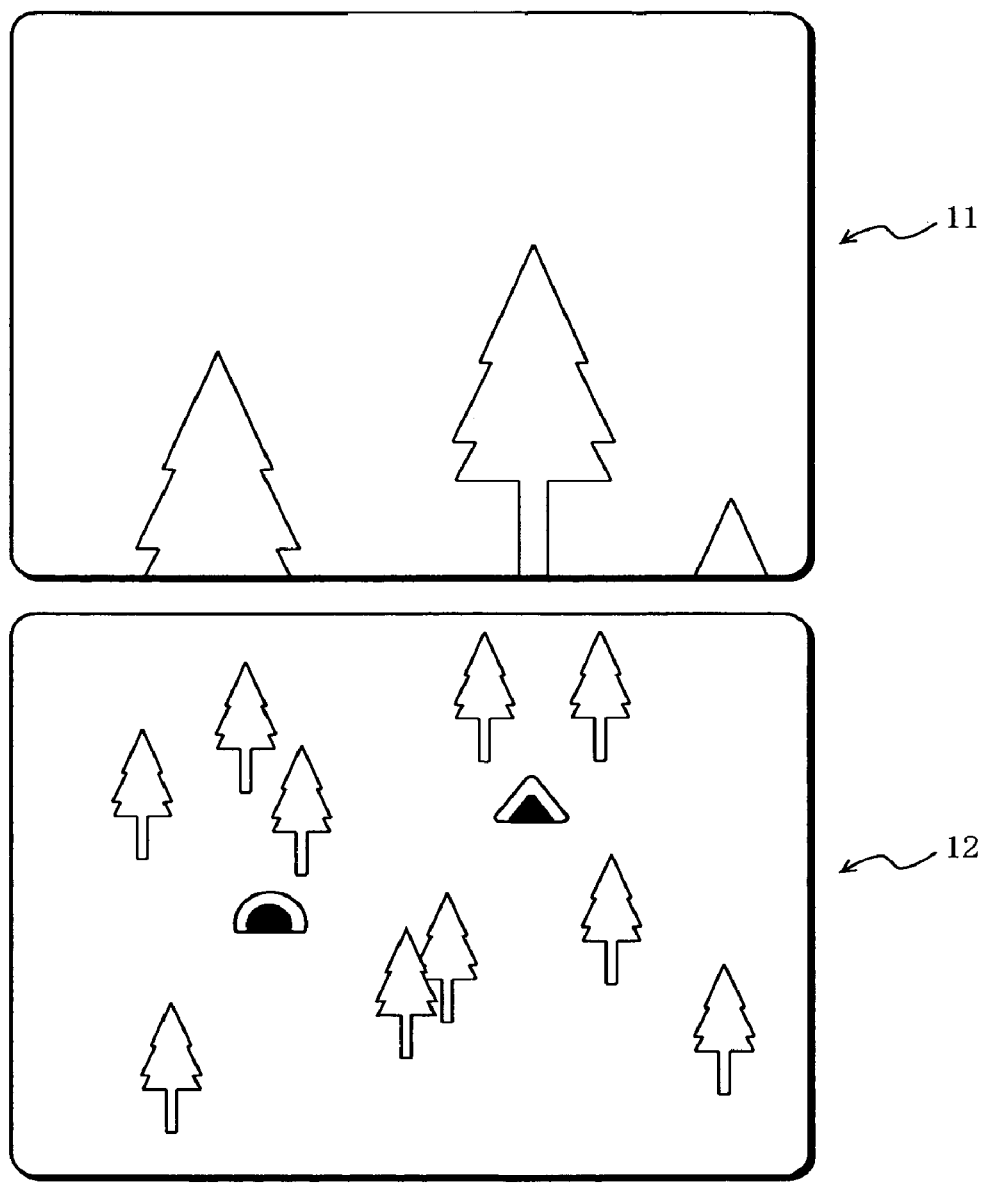

F I G. 6
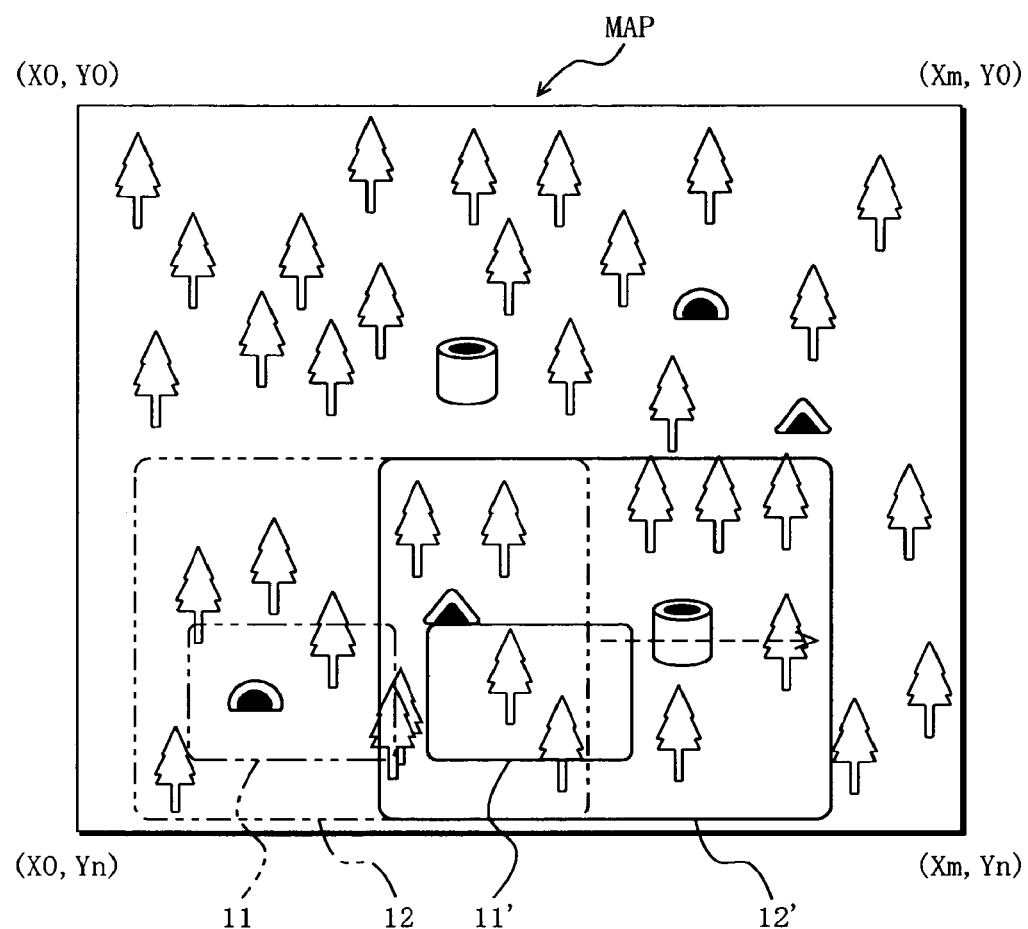

HAND-HELD GAME APPARATUS AND GAME PROGRAM

CROSS-REFERENCES TO RELATED APPLICATIONS

This application is a continuation of application Ser. No. 10/837,650 filed 4 May 2004, the entire contents of which is incorporated herein by reference.

FIELD

The technology herein relates to a hand-held game apparatus and a game program, and more particularly to a hand-held game apparatus including liquid crystal display sections embodying two screens, for example, with a touch panel being provided on at least one of the screens, such that two kinds of maps are displayed on the two screens for allowing a user to enjoy a unique game play; and a game program for use therewith.

BACKGROUND AND SUMMARY

The following conventional techniques are known: Japanese Patent Laid-Open Publication No. H4-369027 (hereinafter "Conventional Technique 1") and Japanese Patent Laid-Open Publication No. H7-294892 (hereinafter "Conventional Technique 2"), each disclosing a mobile information terminal employing a touch panel; Japanese Patent Laid-Open Publication No. 58-116377 (hereinafter "Conventional Technique 3") disclosing a hand-held game apparatus incorporating two screens; Japanese Patent Laid-Open Publication No. 2002-325963 (hereinafter "Conventional Technique 4") disclosing a game system employing two screens; and Japanese Patent Laid-Open Publication No. H6-285259 (hereinafter "Conventional Technique 5") disclosing a controller for a video game machine employing a touch panel.

In Conventional Technique 1 and Conventional Technique 2, two (upper and lower) screens are provided, with a touch panel being provided on one of the screens for displaying an operational input screen. Conventional Technique 1 and Conventional Technique 2 may be suitable for the inputting of text or still image information. From Conventional Technique 1 and Conventional Technique 2, it is not readily known what sort of usage is possible in the context of a video game (e.g., what sort of displayed content is provided by the software).

Conventional Technique 3 is directed to a hand-held game machine provided with two (upper and lower) screens, the upper screen displaying a stationary image of a two-storied building (showing the outer look of both the first and second floors), and the lower screen showing the inside of the first floor in a stationary manner, against which characters and falling movements of oil are displayed in segments. However, since the background images displayed on the upper and lower screens are stationary, and the moving characters and oil drops are only displayed in segments, Conventional Technique 3 is perhaps best suited to displaying images with simple and little motion, as opposed to a map (or an imaginary game world) of a large game space which would be required for popular role playing games (RPGs), simulation RPGs (SRPGs), action games, and shooting games.

Conventional Technique 4 is directed to a game system where a plurality of hand-held game machines are connected to a single video game machine. A shared map which is common to a plurality of players is displayed on a screen that is displayed by the video game machine on a household television set, while a dedicated image is displayed on the screen of each player's hand-held game machine, the latter image being confined to a narrow field as viewed by the player. Conventional Technique 4 uses a single household television set and a plurality of hand-held game machines. While Conventional Technique 4 is suitable for displaying a simple map image such as that of a maze puzzle game, this technique may not be suitable for RPGs, SRPGs, and action games because such games generally require complex and broad maps. Moreover, the picture to be displayed on each hand-held game machine is a field of view as determined by the program; that is, the user is apparently not allowed to select the displayed area. Thus, the game operation may become monotonous, which may lead to boredom of the user.

In Conventional Technique 5, a touch panel and a liquid crystal display device are provided for a game controller, which is to be connected to a video game machine. Operable icons, such as operation switches and the like, are displayed on the liquid crystal display device of the liquid crystal controller (game controller), such that an operation signal which is input by the user touching on the touch panel causes a displayed picture on the TV screen to change. Conventional Technique 5 touches on the problem of displaying two kinds of screens, such as: displaying a game picture of an airplane from a different point of view on the TV screen, while displaying an icon such as a control stick to be operated in a cockpit thereof on the liquid crystal display screen (as shown in its FIG. 3); displaying a game picture of an entire piano on the TV screen, while displaying icons such as keys of the keyboard of the piano to be played on the liquid crystal display screen (as shown in its FIG. 4); displaying an entire map on the TV screen, while displaying an enlarged image including tanks or airplanes which are controllable by the player on the liquid crystal display screen (as shown in its FIG. 7). However, according to Conventional Technique 5, the game screen is nonetheless a single TV screen. Moreover, the display image on the TV screen and the display image on the liquid crystal display screen both depend on the program, which means that the player is probably not able to freely change the displayed area or change the range to be enlarged. Thus, the displayed images may become monotonous, and the user may become bored. Furthermore, since the touch panel and the liquid crystal display device are provided on the game controller, the player presumably has to look down to watch the operative icons or look up to gaze straight ahead at the game picture on the TV screen. Ocular fatigue might result. Moreover, in order to go back and forth between the TV screen and the liquid crystal display screen which is provided on the game controller, a slight change in the viewing angle or viewing direction may not suffice. Such difficulties in looking at the displays could lead to poor controllability.

The technology herein provides a novel hand-held game apparatus which allows a user to play a game while going back and forth between two kinds of maps, namely, a narrow-range map and a broad-range map game. In one exemplary illustrative non-limiting implementation, it is possible to arbitrarily change the displayed state of at least one of the broad-range map and the narrow-range map by manipulating a touch panel which is mounted correspondingly to a liquid crystal display section for displaying the broad-range map. A game program for use therewith is also provided.

Another exemplary illustrative non-limiting implementation provides a hand-held game apparatus which allows a user to play a game by using two kinds of maps, namely, a narrow-range map and a broad-range map game. The player can arbitrarily change the displayed state (e.g., a moving direction and a moving range) of the broad-range map by manipulating a touch panel which is mounted correspondingly to a liquid crystal display section for displaying the broad-range map; and a game program for use therewith is also provided.

In a further exemplary non-limiting implementation providing a hand-held game apparatus which allows a user to play a game by using two kinds of maps, namely, a narrow-range map and a broad-range map game, the player can arbitrarily change the displayed state (e.g., the displayed area or a coordinate position) of the narrow-range map by manipulating a touch panel which is mounted correspondingly to a liquid crystal display section for displaying the broad-range map/A game program for use therewith is also provided.

Yet another object of the present exemplary illustrative non-limiting implementation is directed at providing a hand-held game apparatus which, by using a narrow-range map and a broad-range map game, allows a user to play a game which is novel and interesting. The exemplary non-limiting technology further allows a user to play a game which requires strategic thoughts. A game program for use therewith is also provided.

An exemplary non-limiting hand-held game apparatus comprises a first liquid crystal display section, a second liquid crystal display section, a housing, a touch panel, manipulation detection means, map image data generation means, object image data generation means, map image data change imparting means, and display control means.

The first liquid crystal display section displays a first game picture including a map for a game. The a second liquid crystal display section, located near the first liquid crystal display section, displays a second game picture including a map covering a broader range than does the map displayed on the first liquid crystal display section. The housing accommodates the first liquid crystal display section and the second liquid crystal display section. The touch panel, mounted at least correspondingly to the second liquid crystal display section, outputs coordinate data when the touch panel is manipulated, the coordinate data indicating a manipulated position on a display surface of the second liquid crystal display section.

Further, the manipulation detection means detects at least one of a designated coordinate position and a designated moving direction based on the coordinate data output from the touch panel. Based on a game program, the map image data generation means generates broad-range map image data for causing the second liquid crystal display section to display a broad-range map image, and narrow-range map image data for causing the first liquid crystal display section to display a narrow-range map image. The object image data generation means generates object image data for causing at least the first liquid crystal display section to display an object belonging to the game.

Additionally, in accordance with at least one of the designated coordinate position and the designated moving direction as detected by the manipulation detection means on the second liquid crystal display section, the map image data change imparting means changes at least one of the narrow-range map image data and the broad-range map image data generated by the map image generation means. The display control means controls the first liquid crystal display section to display the narrow-range map image data generated by the map image data generation means together with the object image data generated by the object image data generation means being superposed thereon as the first game picture. The display control means also controls the second liquid crystal display section to display the broad-range map image data generated by the map image data generation means as the second game picture. The display control means further controls one of the first or second liquid crystal display section to display at least one of the broad-range or narrow-range map image data as changed by the map image data change imparting means.

Thus, a hand-held game apparatus can be provided which allows the player to change the displayed state of at least one of the broad-range map and the narrow-range map through the manipulation of the touch panel.

The manipulation detection means may detect the designated coordinate position based on the coordinate data output from the touch panel. The map image data change imparting means changes, in accordance with the designated coordinate position as detected by the manipulation detection means on the broad-range map displayed by the second liquid crystal display section, the narrow-range map image data generated by the map image generation means so as to represent a narrow-range map image around the designated coordinate position.

Thus, the narrow-range map image can be changed so as to represent the neighborhood of a coordinate position designated by means of the touch panel on the broad-range map screen.

The manipulation detection means may detect the designated moving direction based on the coordinate data output from the touch panel. The map image data change imparting means changes, in accordance with the designated moving direction as detected by the manipulation detection means on the broad-range map displayed by the second liquid crystal display section, the broad-range map image data generated by the map image generation means so as to represent a broad-range map image having been moved in the designated moving direction.

Thus, the broad-range map image can be moved (scrolled) in a direction designated through the manipulation of the touch panel.

The manipulation detection means may detect the designated coordinate position and the designated moving direction based on the coordinate data output from the touch panel. The map image data change imparting means is operable to: change, in accordance with the designated coordinate position as detected by the manipulation detection means on the broad-range map displayed by the second liquid crystal display section, the narrow-range map image data generated by the map image generation means so as to represent a narrow-range map image around the designated coordinate position; change, in accordance with the designated moving direction as detected by the manipulation detection means on the broad-range map displayed by the second liquid crystal display section, the broad-range map image data generated by the map image generation means so as to represent a broad-range map image having been moved in the designated moving direction.

Thus, based on the manipulation of the touch panel, the displayed area of the narrow-range map image can be changed, and also the broad-area map image can be scrolled.

A further exemplary illustrative non-limiting hand-held game apparatus may comprise a first liquid crystal display section, a second liquid crystal display section, a housing, a touch panel, manipulation detection means, first map image data generation means, second map image data generation means, object image data generation means, map image data change imparting means, and display control means, where the change in the map image according to the first aspect is a change in the narrow-range map image.

The first liquid crystal display section, the second liquid crystal display section, the housing, the touch panel, and the object image data generation means may be constructed similarly to those in the hand-held game apparatus according to the first aspect. The map image data generation means comprises a first map image data generation means and a second map image data generation means. The manipulation detection means at least detects coordinate data of a designated coordinate position based on a manipulation of the touch panel. Based on a game program, the first map image data generation means generates narrow-range map image data for causing the first liquid crystal display section to display a narrow-range map image. Based on the game program, the second map image data generation means generates broad-range map image data for causing the second liquid crystal display section to display a broad-range map image. In response to an instruction of a designated coordinate position for enlarged display as detected by the manipulation detection means on the broad-range map image, the map image data change imparting means at least changes the narrow-range map image data so as to represent a narrow-range map image around the designated coordinate position. The display control means controls the first liquid crystal display section to display as the first game picture the narrow-range map image data. This data may be generated by the first map image data generation means or changed by the map image change imparting means together with the object image data generated by the object image data generation means being superposed thereon. The display control means also controls the second liquid crystal display section to display as the second game picture the broad-range map image data generated by the second map image data generation means.

While the broad-range map image is being displayed by the second liquid crystal display section, the manipulation detection means generates data designating a displayed area for the narrow-range map image centered around the designated coordinate position, based on a predetermined click operation on the touch panel. Also, while the broad-range map image is being displayed by the second liquid crystal display section, the map image data change imparting means changes, in accordance with the data designating the displayed area as detected by the manipulation detection means, the narrow-range map image data so as to represent a narrow-range map image around the designated coordinate position.

The manipulation detection means may detect the designated moving direction based on a manipulation of the touch panel. The map image data change imparting means changes, in response to an instruction of a moving direction as detected by the manipulation detection means, the broad-range map image data generated by the second map image generation means so as to represent a broad-range map image having been moved in the designated moving direction.

The manipulation detection means may detect the instruction of the moving direction based on an amount of change in the coordinate data as detected overtime. The map image data change imparting means comprises scroll display control means for gradually changing, in accordance with the instruction of the moving direction as detected by the manipulation detection means, the broad-range map image data generated by the second map image data generation means so as to represent a broad-range map image which is gradually scrolled in the designated moving direction.

A further exemplary illustrative non-limiting hand-held game apparatus may comprise a first liquid crystal display section, a second liquid crystal display section, a housing, a touch panel, manipulation detection means, first map image data generation means, second map image data generation means, object image data generation means, map image data change imparting means, and display control means, where the change in the map image according to the first aspect is a change in the broad-range map image. The first liquid crystal display section, the second liquid crystal display section, the housing, the touch panel, and the object image data generation means are constructed similarly to those in the hand-held game apparatus according to the first aspect. The map image data generation means comprises a first map image data generation means and a second map image data generation means. The manipulation detection means at least detects a moving direction in accordance with a change in a designated coordinate position, based on the coordinate data output from the touch panel. Based on a game program, the first map image data generation means generates narrow-range map image data for causing the first liquid crystal display section to display a narrow-range map image. Based on the game program, the second map image data generation means generates broad-range map image data for causing the second liquid crystal display section to display a broad-range map image. In response to an instruction of a moving direction as detected by the manipulation detection means on the broad-range map image, the map image data change imparting means at least changes the narrow-range map image data generated by the second map image data generation means so as to represent a broad-range map image having been moved in the designated moving direction. The display control means controls the first liquid crystal display section to display as the first game picture the narrow-range map image data generated by the first map image data generation means together with the object image data generated by the object image data generation means being superposed thereon. The display control means also controls the second liquid crystal display section to display as the second game picture the broad-range map image data generated by the second map image data generation means or changed by the map image change imparting means.

The manipulation detection means may further detect a designated coordinate position based on a manipulation of the touch panel. The map image data change imparting means changes, in response to the manipulation detection means detecting the coordinate position, the narrow-range map image data generated by the first map image data generation means so as to represent an enlarged narrow-range map image around the designated coordinate position. The display control means controls the first liquid crystal display section to display as the first game picture the narrow-range map image data having been moved by the map image data change imparting means together with the object image data generated by the object image data generation means being superposed thereon.

The object image data generation means may generate large-size player object image data for causing the first liquid crystal display section to display a large-size player object and small-size player object image data for causing the second liquid crystal display section to display a small-size player object. The map image data change imparting means changes the narrow-range map image data generated by the map image generation means in accordance with the designated coordinate position as detected by the manipulation detection means on the broad-range map, and changes the broad-range map image data so as to represent a scrolled broad-range map image in accordance with the designated moving direction as detected by the manipulation detection means on the broad-range map. The display control means is operable to: control the first liquid crystal display section to display as the first game picture the narrow-range map image data having been changed by the map image data change imparting means together with the large-size player object image data generated by the object image data generation means being superposed thereon; and to control the second liquid crystal display section to display as the second game picture, the broad-range map image data having been changed by the map image data change imparting means together with the small-size player object image data generated by the object image data generation means being superposed thereon, thus causing the changed narrow-range map image and the changed broad-range map image to be displayed.

An exemplary illustrative non-limiting game program is provided corresponding to the hand-held game apparatus of the first aspect, for use with a hand-held game apparatus comprising a first liquid crystal display section for displaying a first game picture including a map for a game; a second liquid crystal display section, located near the first liquid crystal display section, for displaying a second game picture including a map covering a broader range than does the map displayed on the first liquid crystal display section; a housing for accommodating the first liquid crystal display section and the second liquid crystal display section; a touch panel, mounted at least correspondingly to the second liquid crystal display section, for outputting coordinate data when the touch panel is manipulated, the coordinate data indicating a manipulated position on a display surface of the second liquid crystal display section; and a computer. The game program causes the computer to execute: a manipulation detection step, a map image data generation step, an object image data generation step, a map image data change imparting step, and a display control step.

The manipulation detection step detects at least one of a designated coordinate position and a designated moving direction based on the coordinate data output from the touch panel. Based on a game program, the map image data generation step generates broad-range map image data for causing the second liquid crystal display section to display a broad-range map image and narrow-range map image data for causing the first liquid crystal display section to display a narrow-range map image. The object image data generation step generates object image data for causing at least the first liquid crystal display section to display an object belonging to the game. In accordance with at least one of the designated coordinate position and the designated moving direction as detected by the manipulation detection step on the broad-range map, the map image data change imparting step changes at least one of the narrow-range map image data and the broad-range map image data generated by the map image generation step. The display control step controls the first liquid crystal display section to display as the first game picture the narrow-range map image data generated by the map image data generation step together with the object image data generated by the object image data generation step being superposed thereon. The display control step controls the second liquid crystal display section to display as the second game picture the broad-range map image data generated by the map image data generation step. The display control step further controls one of the first or second liquid crystal display section to display at least one of the broad-range or narrow-range map image data as changed by the map image data change imparting step.

Thus, a game program can be provided which allows the player to change the displayed state of at least one of the broad-range map and the narrow-range map through the manipulation of the touch panel.

The map image data change imparting step may change, in accordance with the designated coordinate position as detected by the manipulation detection step on the broad-range map, the narrow-range map image data generated by the map image generation step so as to represent a narrow-range map image around the designated coordinate position.

The map image data change imparting step may change, in accordance with the designated moving direction as detected by the manipulation detection step on the broad-range map, the broad-range map image data generated by the map image generation step so as to represent a broad-range map image having been moved in the designated moving direction.

The map image data change imparting step may comprise: changing, in accordance with the designated coordinate position as detected by the manipulation detection step on the broad-range map, the narrow-range map image data generated by the map image generation step so as to represent a narrow-range map image around the designated coordinate position; and changing, in accordance with the designated moving direction as detected by the manipulation detection step on the broad-range map, the broad-range map image data generated by the map image generation step so as to represent a broad-range map image having been moved in the designated moving direction.

An exemplary non-limiting game program may be provided corresponding to the hand-held game apparatus of the fifth aspect, for use with a hand-held game apparatus comprising: a first liquid crystal display section for displaying a first game picture including a map for a game; a second liquid crystal display section, located near the first liquid crystal display section, for displaying a second game picture including a map covering a broader range than does the map displayed on the first liquid crystal display section; a housing for accommodating the first liquid crystal display section and the second liquid crystal display section in predetermined positions; a touch panel, mounted at least correspondingly to the second liquid crystal display section, for outputting coordinate data when the touch panel is manipulated, the coordinate data indicating a manipulated position on a display surface of the second liquid crystal display section; and a computer. The game program causes the computer to execute: a manipulation detection step, a first map image data generation step, a second map image data generation step, an object image data generation step, a map image data change imparting step, and a display control step. The manipulation detection step at least detects coordinate data of a designated coordinate position based on a manipulation of the touch panel. Based on a game program, the first map image data generation step generates narrow-range map image data for causing the first liquid crystal display section to display a narrow-range map image. Based on the game program, the second map image data generation step generates broad-range map image data for causing the second liquid crystal display section to display a broad-range map image. The object image data generation step generates object image data for causing at least the first liquid crystal display section to display an object belonging to the game. In response to an instruction of a designated coordinate position for enlarged display as detected by the manipulation detection step on the broad-range map image, the map image data change imparting step at least changes the narrow-range map image data so as to represent a narrow-range map image around the designated coordinate position. The display control step controls the first liquid crystal display section to display as the first game picture the narrow-range map image data generated by the first map image data generation step or changed by the map image change imparting step together with the object image data generated by the object image data generation step being superposed thereon. The display control step also controls the second liquid crystal display section to display as the second game picture the broad-range map image data generated by the second map image data generation step.

While the broad-range map image is being displayed by the second liquid crystal display section, the manipulation detection step generates data designating a displayed area for the narrow-range map image which is centered around the designated coordinate position, based on a predetermined click operation on the touch panel. Also, while the broad-range map image is being displayed by the second liquid crystal display section, the map image data change imparting step changes, in accordance with the data designating the displayed area as detected by the manipulation detection step, the narrow-range map image data so as to represent a narrow-range map image around the designated coordinate position.

The manipulation detection step may detect the designated moving direction based on a manipulation of the touch panel. The map image data change imparting step changes, in response to an instruction of a moving direction as detected by the manipulation detection step, the broad-range map image data generated by the second map image generation step so as to represent a broad-range map image having been moved in the designated moving direction.

The manipulation detection step may detect the instruction of the moving direction based on an amount of change in the coordinate data as detected over time. The map image data change imparting step comprises a scroll display control step of gradually changing, in accordance with the instruction of the moving direction as detected by the manipulation detection step, the broad-range map image data generated by the second map image data generation step so as to represent a broad-range map image which is gradually scrolled in the designated moving direction.

An exemplary illustrative non-limiting game program is provided corresponding to the hand-held game apparatus of the twelfth aspect, for use with a hand-held game apparatus comprising a first liquid crystal display section for displaying a first game picture including a map for a game; a second liquid crystal display section, located near the first liquid crystal display section, for displaying a second game picture including a map covering a broader range than does the map displayed on the first liquid crystal display section; a housing for accommodating the first liquid crystal display section and the second liquid crystal display section in predetermined positions; a touch panel, mounted at least correspondingly to the second liquid crystal display section, for outputting coordinate data when the touch panel is manipulated, the coordinate data indicating a manipulated position on a display surface of the second liquid crystal display section; and a computer. The game program causes the computer to execute: a manipulation detection step, a first map image data generation step, a second map image data generation step, an object image data generation step, a map image data change imparting step, and a display control step. The manipulation detection step at least detects a moving direction in accordance with a change in a designated coordinate position, based on the coordinate data output from the touch panel. Based on a game program, the first map image data generation step generates narrow-range map image data for causing the first liquid crystal display section to display a narrow-range map image. Based on the game program, the second map image data generation step generates broad-range map image data for causing the second liquid crystal display section to display a broad-range map image. The object image data generation step generates object image data for causing at least the first liquid crystal display section to display an object belonging to the game. In response to an instruction of a moving direction as detected by the manipulation detection step on the broad-range map image, the map image data change imparting step at least changes the narrow-range map image data generated by the second map image data generation step so as to represent a broad-range map image having been moved in the designated moving direction. The display control step controls the first liquid crystal display section to display, as the first game picture, the narrow-range map image data generated by the first map image data generation step together with the object image data generated by the object image data generation step being superposed thereon. The display control step also controls the second liquid crystal display section to display as the second game picture, the broad-range map image data generated by the second map image data generation step or changed by the map image change imparting step.

Thus, according to the exemplary non-limiting implementations, a novel hand-held game apparatus is provided which allows a user to play a game while going back and forth between two kinds of maps, namely, a narrow-range map and a broad-range map game. It is also possible to arbitrarily change the displayed state of at least one of the broad-range map and the narrow-range map by manipulating a touch panel which is mounted correspondingly to a liquid crystal display section for displaying the broad-range map. A game program for use therewith is also provided.

Moreover, a user may play a game by using two kinds of maps, namely, a narrow-range map and a broad-range map game. In this game, the player can arbitrarily change the displayed state (e.g., a moving direction and a moving range) of the broad-range map by manipulating a touch panel which is mounted correspondingly to a liquid crystal display section for displaying the broad-range map. A game program for use therewith is also provided.

Moreover, the player can arbitrarily change the displayed state (e.g., the displayed area or a coordinate position) of the narrow-range map by manipulating a touch panel which is mounted correspondingly to a liquid crystal display section for displaying the broad-range map.

Furthermore, a handheld game apparatus and associated game program using a narrow-range map and a broad-range map game allows a user to play a game which is novel and interesting and which requires strategic thoughts.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 3 is an illustration of the entirety of a game map of a game which is stored in a map image data storage section 25;

FIG. 4 is a diagram showing exemplary images to be displayed on a LCD 11 and a LCD 12 in an initial state of the broad-range map show in FIG. 3;

FIG. 6 is an illustration of the entire game map within which a broad-range map to be displayed on the LCD 12 is moved (scrolled);

DETAILED DESCRIPTION

Figure 1:
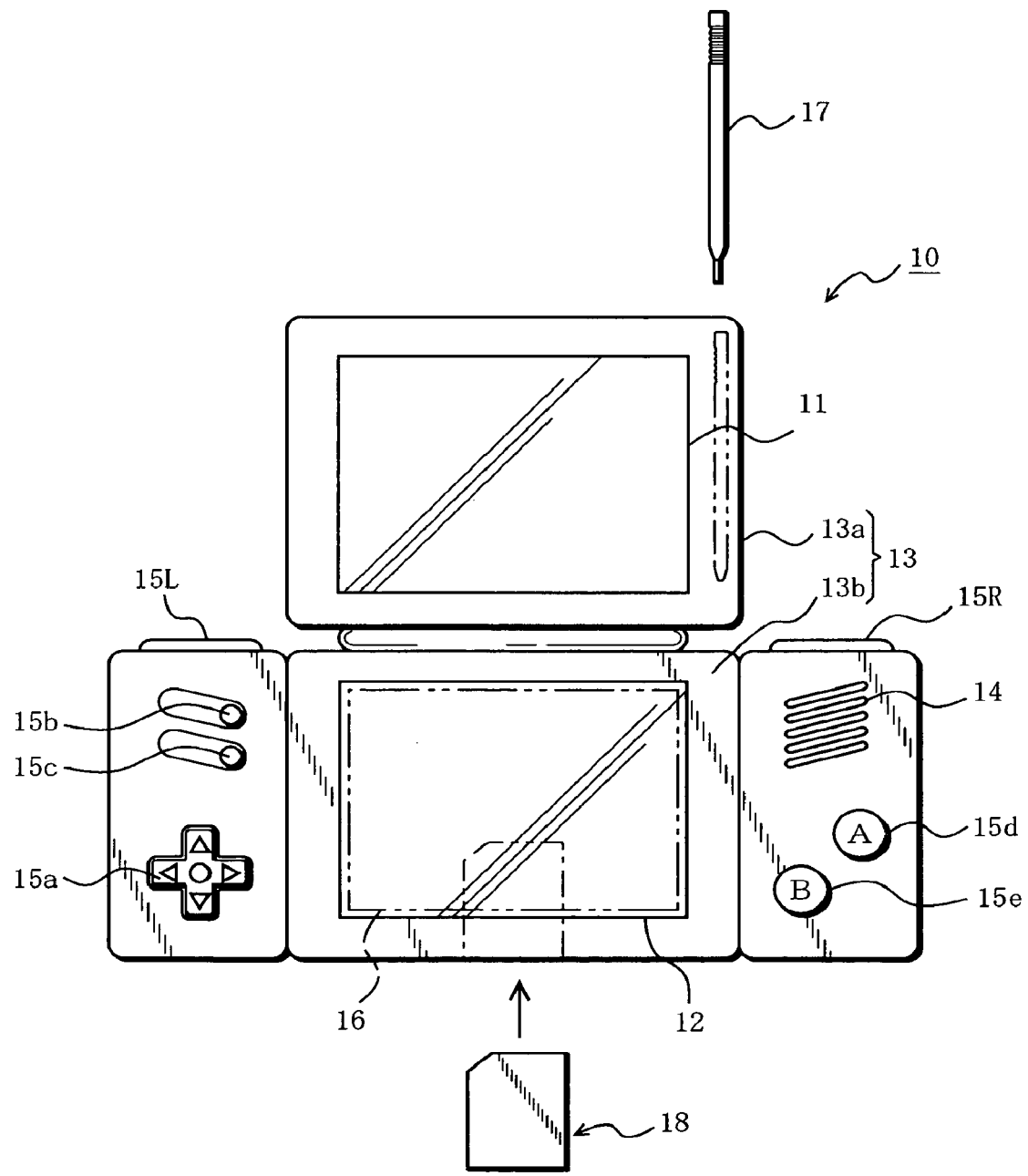
FIG. 1 is a view showing the outer look of a hand-held game apparatus according to an exemplary non-limiting illustrative implementation.

FIG. 1 is a view showing the outer look of a hand-held game apparatus according to an exemplary non-limiting illustrative implementation. As shown in FIG. 1, the hand-held game apparatus 10 according to one exemplary non-limiting illustrative implementation is accommodated in a housing 13 for placing two liquid crystal display devices (LCDs) 11 and 12 in predetermined positions. Specifically, in the case where the first liquid crystal display device (hereinafter referred to as "LCD") 11 and the second LCD 12 are to be disposed one on top of the other, the housing 13 is composed of an upper housing 13a and a lower housing 13b, the upper housing 13a being supported by a portion of the upper side of the lower housing 13b so as to be pivotable. The upper housing 13a has a planar contour which is slightly larger than that of the first LCD 11. The upper housing 13a has an opening in one principal face thereof, through which a display surface of the LCD 11 is exposed. The lower housing 13b has a more elongated planar contour than that of the upper housing 13a (i.e., so as to have a longer lateral dimension). An opening for exposing the display surface of the LCD 12 is formed in a portion of the lower housing 13b which lies substantially in the center of the lower housing 13b along the lateral direction. An operation switch section 15 is provided on right and left wings of the lower housing 13b between which the LCD 12 is interposed. A sound hole 14b is formed in either wing of the lower housing 13b.

The operation switch section 15 includes: a direction switch 15a, a start switch 15b, and a select switch 15c, which are provided on a principal face of the left wing of the lower housing 13b (lying to the left of the LCD 12); and action switches 15d and 15e, which are provided on a principal face of the right wing of the lower housing 13b (lying to the right of the LCD 12). The direction switch 15a is used by a player for providing instructions of a direction in which to move a player object (or a player character) that can be controlled by the player, or instructions of a direction in which to move a cursor, for example. The action switches 15d and 15e are used for giving instructions of any action other than instructions of directions, e.g., "jump", "punch", or "use a weapon" in the case of an action game, or "get an item" or "select a weapon" or "select a command" in the case of a role playing game (RPG) or a simulation RPG. As necessary, more action switches may be added, and side switches 15L and 15R may be further provided on an upper portion (upper side face) of the area of the lower housing 13b in which the operation switches 15 are mounted.

A touch panel 16 is mounted on the upper principal face of the LCD 12. The touch panel 16 may be of any one of a resistive film type, an optical type (infrared type), or a capacitive coupling type. When a stick 17 (or a finger) is pressed against or moved or dragged on the upper principal face of the touch panel 16, the touch panel 16 detects the coordinate position of the stick 17 and outputs coordinate data. The touch panel 16 is to be used for indicating the following instructions on a map covering a relatively broad area (hereinafter referred to as the "broad-range map"), which is to be displayed on the screen of the LCD 12: changing specific coordinates around which to display a map covering a narrower area than that of the broad-range map (hereinafter referred to as the "narrow-range map"); or designating a moving direction or a scroll direction for the broad-range map itself. However, depending on the type of the game, the touch panel 16 may also be used for indicating any other type of input instructions (e.g., selection or manipulation of an icon which is displayed on the LCD 12, or an instruction to input coordinates).

As described above, the hand-held game apparatus 10 includes the LCDs 11 and 12, which define liquid crystal display sections embodying two screens, with the touch panel 16 being provided on the upper principal face of one of the LCDs (for example, the lower screen, i.e., the LCD 12). Thus, there exist two screens (LCDs 11 and 12) and two operation sections (15,16). In this construction, the touch panel 16 is to be used for indicating different operation inputs (or input instructions) from those which can be indicated by using the operation switch section 15.

As necessary, a hole 14a for accommodating the stick 17 with which to manipulate the touch panel 16 is provided near a side face of the upper housing 13a. The hole 14a can hold the stick 17. In a portion of a side face of the lower housing 13b is provided a cartridge receptacle (not shown), into which a game cartridge 18 internalizing a memory for storing a game program (e.g., a ROM) is detachably inserted. A connector (not shown) lies inside the cartridge receptacle for providing electrical connection with the game cartridge 18. Furthermore, the lower housing 13b (or alternatively the upper housing 13a) accommodates an electronic circuit board (indicated as 30 in FIG. 8) on which various electronic components such as a CPU are mounted. Examples of information storage media for storing a game program are not limited to non-volatile semiconductor memories such as ROMs or flash memories, but may also be optical disk type recording media, such as CD-ROMs, DVDs, or the like.

Figure 2:
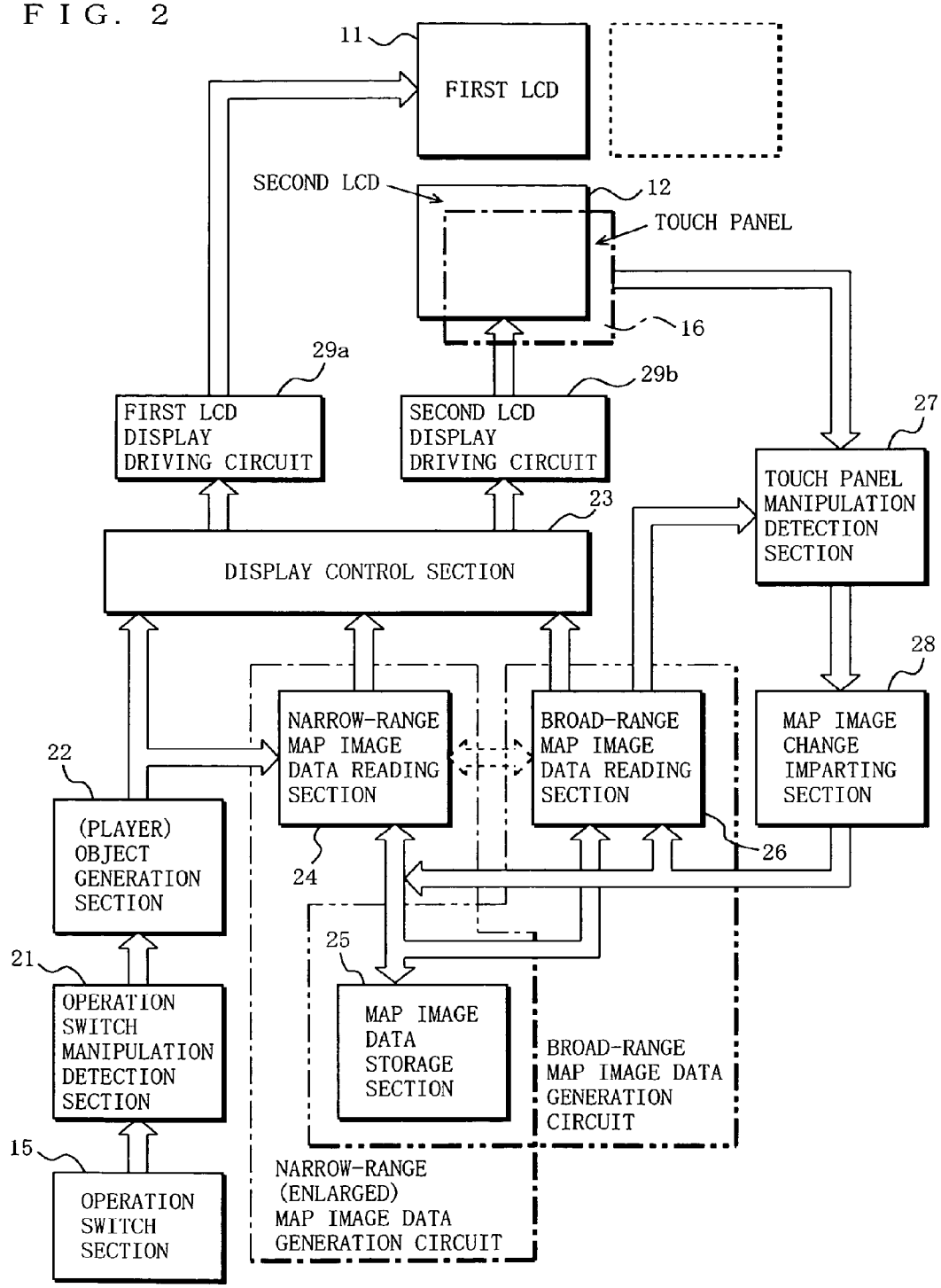
FIG. 2 is a principle block diagram (functional block diagram) illustrating the operation principle of a hand-held game apparatus according to an exemplary non-limiting illustrative implementation.

FIG. 2 is a block diagram (functional block diagram) illustrating the operation of the hand-held game apparatus according to an exemplary non-limiting illustrative implementation. In FIG. 2, if an operation signal, which is input by manipulating the operation switch section 15, is input to an operation switch manipulation detection section 21, the manipulation detection section 21 detects which one(s) of the direction switch 15a, the switches 15b to 15e,15L, and 15R in the operation switch section 15 has been manipulated and how the switch(es) has been manipulated. The operation switch manipulation detection section also passes data expressing this information (hereinafter referred to as "manipulation detection data") to an object image data generation section 22. The object image data generation section 22 includes: an object data storage section (not shown) for storing image data of a player object (or a player character) to be controlled by the player, as well as image data of moving objects, such as non-player objects (i.e., enemy objects or friend objects which cannot be controlled by the player); and an object generation control section (not shown) which reads image data of the player object and/or non-player objects stored in the object storage section. Based on an object control program and the manipulation detection data in the operation switch section 15, the object image data generation section 22 generates data representing a changed image of the player object, and as necessary, generates image data of non-player object based on the program, and passes such image data to a display control section 23. In order to allow the narrow-range map image serving as a background screen to change in response to the movements of the player object, the current coordinate data of the player object is passed to a narrow-range map image data reading section 24.

The narrow-range map image data reading section 24 reads the map image data stored in the map image data storage section 25, generates narrow-range map image data, and supplies the narrow-range map image data to the display control section 23. As used herein, a "map" represents a game area within a game space, e.g., a background, the inside of a room, or a basement, and may be referred to as a "stage" or a "world" in some games. The broad-range map image data reading section 26 reads the map image data stored in the map image data storage section 25, generates broad-range map image data, and supplies the broad-range map image data to the display control section 23. The map image data storage section 25 and the narrow-range map image data reading section 24 together constitute a narrow-range map image data generation section. The map image data storage section 25 and the broad-range map image data reading section 26 together constitute a broad-range map image data generation section. The narrow-range map image which is generated by the narrow-range map image data reading section 24 is a map image of a regular size displayable by game software on a conventional hand-held game machine or a household video game machine. The broad-range map image generated by the broad-range map image data reading section 26 is a map image covering a broader area than the regular sized map image. Thus, it will be appreciated that "broad-range" and "narrow-range" are mere references to relative sizes. The "broad-range map image" and the "narrow-range map image" may alternatively be referred to as a "reduced map" and an "enlarged map", respectively. Specifically, in an exemplary non-limiting illustrative implementation where the map image data storage section 25 stores narrow-range map (enlarged map) image data, the narrow-range map image data reading section 24 would only need the function of designating a read address, whereas the broad-range map image data reading section 26 would have the function of performing an image reduction in addition to the function of designating a read address. Conversely, in an exemplary non-limiting illustrative implementation where the map image data storage section 25 stores broad-range map (reduced map) image data, the broad-range map image data reading section 26 would only need the function of designating a read address, whereas the narrow-range map image data reading section 24 would have the function of performing an image enlargement in addition to the function of designating a read address.

If increase in the required memory capacity is not a problem, the map image data storage section 25 may be composed of a first storage section (not shown) for storing narrow-range map image data and a second storage section (not shown) for storing broad-range map image data, and the narrow-range map image data reading section 24 may control the data read from the first storage section whereas the broad-range map image data reading section 26 may control the data read from the second storage section.

When the player designates a coordinate position on the LCD 12 using the stick 17, his/her finger, or any other suitable device, or designates a moving direction, the touch panel 16 detects the designated coordinate data and passes it to the touch panel manipulation detection section 27. If a coordinate position is designated by a predetermined manipulation (e.g., the same coordinate position being designated twice in the fashion of a double click with a mouse), the player is giving an instruction indicating an area to be displayed as the narrow-range map (enlarged map) image, this area being centered around the coordinates designated in the broad-range map image which is being displayed on the display screen of the LCD 12. In this case, the manipulation detection section 27 generates center coordinate data of the narrow-range map image, and supplies the center coordinate data to a map image change imparting section 28. On the other hand, if the player designates a moving direction (e.g., the coordinates as designated r gradually change so as to indicate a movement in a certain direction), using the stick 17, his/her finger, or any other suitable device, the player is giving an instruction for moving or scrolling the broad-range map image, which is displayed on the display screen of the LCD 12, in the designated direction. In this case, the manipulation detection section 27 supplies moving direction data (together with moving amount data, if necessary) to the map image change imparting section 28. In the case of receiving center coordinate data indicating an area to be displayed as the narrow-range map image, the map image change imparting section 28 supplies the coordinate data to the narrow-range map image data reading section 24, so that a narrow-range map image after change (which is centered around the designated coordinate position) is displayed. On the other hand, in the case of receiving moving direction data, the map image change imparting section 28 supplies the moving direction data to the broad-range map image data reading section 26, so that broad-range map image data which has been scrolled in the designated moving direction is generated.

The display control section 23 merges the narrow-range map image data which has been generated by the narrow-range map image data reading section 24 with the object image data which has been generated by the object data generation section 22, and passes the result as a first game picture to a first LCD display driving circuit 29a, so as to be displayed on the LCD 11. Moreover, the display control section 23 passes the broad-range map image data which has been generated by the broad-range map image data reading section 26 as a second game picture to a second LCD display driving circuit 29b, so as to be displayed on the LCD 12. In the case where coordinate data has been supplied from the map image data change imparting section 28, the narrow-range map image data reading section 24 reads out image data of a narrow-range map (enlarged map) which is centered around the designated coordinate position, so that a narrow-range map image after change will be displayed on the LCD 11. On the other hand, if moving direction data has been supplied from the map image data change imparting section 28, the broad-range map image data reading section 26 will read out broad-range map image data which gradually changes so that the broad-range map will appear to be gradually moving in the designated moving direction. As a result of this, a moving (or scrolling) narrow-range map image will be displayed on the LCD 11.

The instruction of changes to be given through the manipulation of the touch panel 16 may be confined to a change of the displaying coordinates for the enlarged displaying of a narrow-range map or to changing the moving direction for the broad-range map, or may involve changes in both map images. In the case where the broad-range map image is to be moved in accordance with a moving instruction by means of the touch panel 16, not only the moving direction of the users finger or the like, but also an amount of movement (vector) may be detected so that the broad-range map image is moved by a distance which is in accordance with the detected moving amount.

FIG. 3 is an illustration of the entirety of a game map of a game which is stored in a map image data storage section 25. The map (MAP) has a game space which is a multiple of times larger than the extent which can be displayed on the LCD 12. In the example shown in FIG. 3 it is assumed that the map (MAP) is twice as long and twice as wide as the display screen (or the displayed area) of the LCD 12, thus accounting for an area which is four times as large as the display screen (or the displayed area) of the LCD 12. It is further assumed that the narrow-range map to be displayed on the first LCD 11 has a theoretical displayed area which is 1/2.5 times as large as the displayed area of the LCD 12. However, since the physical screen sizes of the LCD 11 and the LCD 12 are equal, the narrow-range map on the LCD 11 is to be displayed as an enlarged map image of a portion of a background image in the broad-range map on the LCD 12, the ratio of enlargement being 2.5 times. In the actual game, moving objects (the player object and computer-controlled enemy objects and the like) may be merged on the narrow-range map image shown on the upper screen (i.e., the LCD 11). On the other hand, the LCD 12 may show the broad-range map image alone, or, if necessary, show a mark indicating where the player object is supposed to exist (or alternatively a smaller player object which has been reduced in accordance with the ratio of reduction of the broad-range map to the narrow-range map) as merged with the broad-range map image. Note that, in FIG. 3, any moving objects such as the player object and non-player objects (i.e., enemy objects or friend objects which cannot be controlled by the player) are omitted from illustration. In the actual game, a plurality of such maps (MAP) may be employed, to which map numbers are assigned for distinction.

Next, with reference to the principle block diagram of FIG. 2 and some exemplary game screens, an exemplary operation in which the displaying coordinates for a narrow-range map image are designated by the user upon a broad-range map image will be described. First, it is assumed that a broad-range map image as depicted by a solid line in the lower left corner of FIG. 3 is being displayed on the second LCD 12, whereas a narrow-range map image, as depicted by a broken line in the upper left corner of the displayed broad-range map image, is being displayed on the first LCD 11. Assuming that the entire map (MAP) (any portion of which may be displayed as the broad-range map) spans an area from coordinates (X0, Y0) to coordinates (Xm,Yn), the broad-range map image which is currently displayed on the LCD 12 is an area delineated by the following four points: coordinates (X0,Yn/2), coordinates (Xm/2,Yn/2), coordinates (X0,Yn), and coordinates (Xm/2,Yn). On the other hand, the narrow-range map image to be displayed on the LCD 11 is an area extending from an origin which coincides with the coordinates (X0,Yn/2) of the broad-range map image, assuming that the origin of the narrow-range map image is located at its upper left corner. In this state, the LCD 11 and the LCD 12 will be displaying images which are shown in the upper half (upper screen) and the lower half (lower screen) of FIG. 4, respectively.

In this state, if the player were to move the player object shown on the narrow-range map image to a desired coordinate position, the narrow-range map image would appear to be moving (i.e., scrolling) only in accordance with the movement of the player object, which might feel slow to the player. The player would need to impatiently hold down the direction switch 15*a* in the relevant moving direction until the player object reaches the desired coordinate position. However, through the above-described input operations via the touch panel 16, in an exemplary non-limiting illustrative implementation the player can move the player object to the desired coordinate position quickly and easily.

Figure 5:
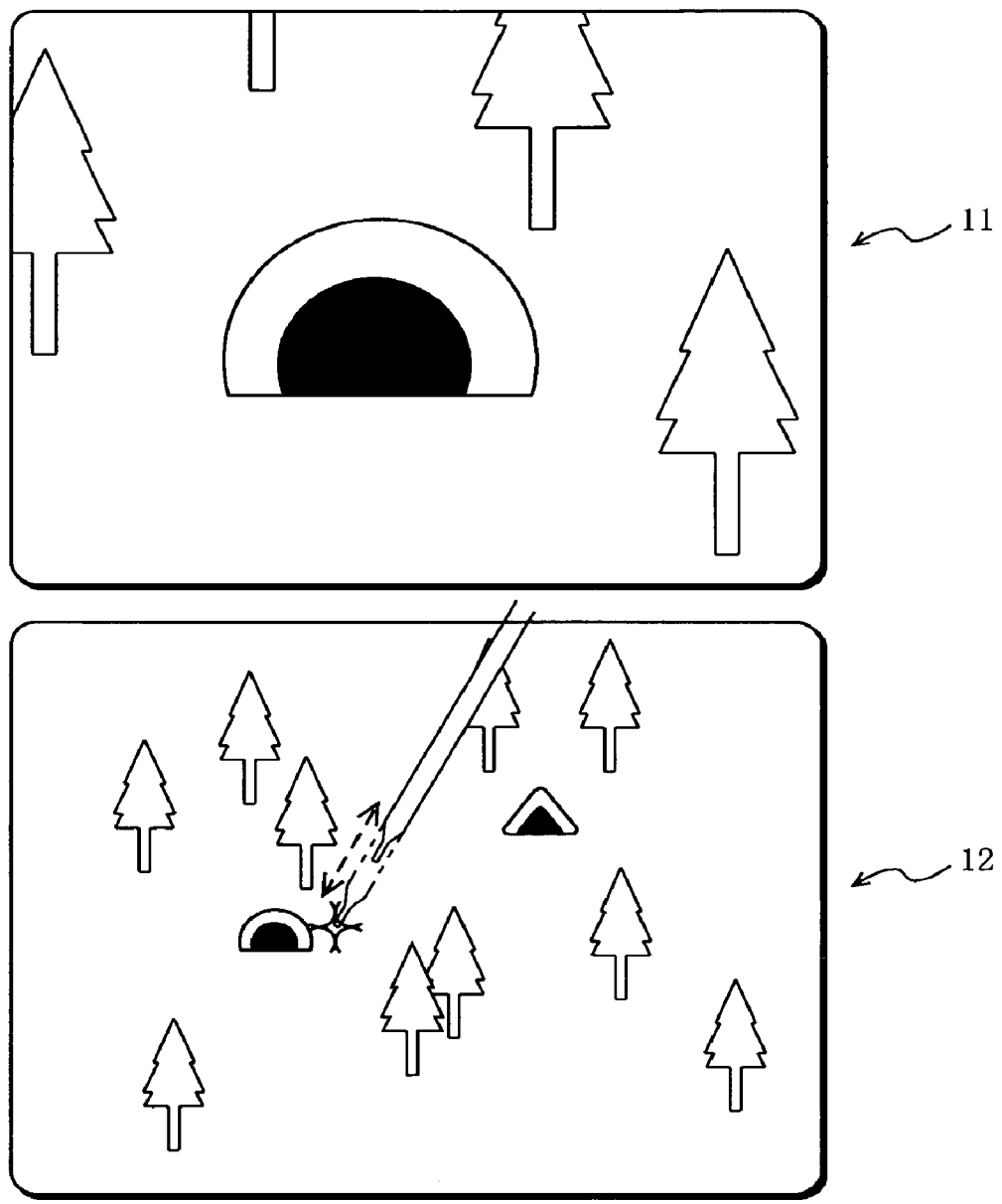
FIG. 5 is a diagram showing exemplary images on the LCD 11 and the LCD 12 in the case where a narrow-range map image is changed by designating a desired coordinate position in the broad-range map image shown in FIG. 3.

For example, let us assume that, in order to designate a change of the displaying coordinates for the narrow-range map to be displayed on the screen of the LCD 11, the player has operated the touch panel 16 by twice designating (i.e., double clicking) a coordinate position near a cave (shown by double semicircles), which is shown slightly to the left from the center of FIG. 5 (and near the lower left corner of FIG. 3). The reason for designating the same coordinate position twice is that it would be impossible with only one designation to distinguish whether a coordinate position for the narrow-range map to be displayed has been designated, or the stick 17 is going to be moved to further designate a moving direction. Any other method besides twice designation can be used so long as the two input operations can be distinguished (e.g., draw a circle). In response to the twice designation, the touch panel 12 generates coordinate data of the coordinate position (shown as "x" in FIG. 3) twice in a row, and outputs the generated coordinate data to the manipulation detection section 27. In response to receiving the same coordinate data twice in a row, the manipulation detection section 27 generates changed coordinate data and a signal indicating the change in the displaying coordinates, such that the narrow-range map image will be redisplayed so as to be centered around the new coordinate position. These data and signal are supplied to the narrow-range map image data reading section 24. In response, the narrow-range map image data reading section 24 generates a read address for map image data based on the changed coordinate data, reads out map image data defining a displayed area on the LCD 11 centered around the new coordinate position, and subjects the data to an enlargement process before being output to the display control section 23. The display control section 23 generates merged image data, which contains moving object images such as the player object and/or the non-player objects being merged on the changed narrow-range map image, and supplies the generated merged image data to the first LCD display driving circuit 29*a* so as to be displayed on the LCD 11. As a result, the LCD 11 displays the narrow-range map image as shown in the upper half (upper screen) of FIG. 5, whereas the LCD 12 displays the broad-range map image as shown in the lower half (lower screen) of FIG. 5.

Thus, within the broad-range map image displayed on the screen of the LCD 12, the player can designate through a simple operation a narrow-range map (enlarged map) for being displayed on the LCD 11, around a desired coordinate position. Therefore, by going back and forth between the two kinds of maps, the player can select a displayed area of the narrow-range map to his or her own advantage for playing the game, and such changes can be made with an arbitrary timing. This allows the user to play the game with strategic thoughts, and enhances the strategic aspect of the game playing.

Figure 7:
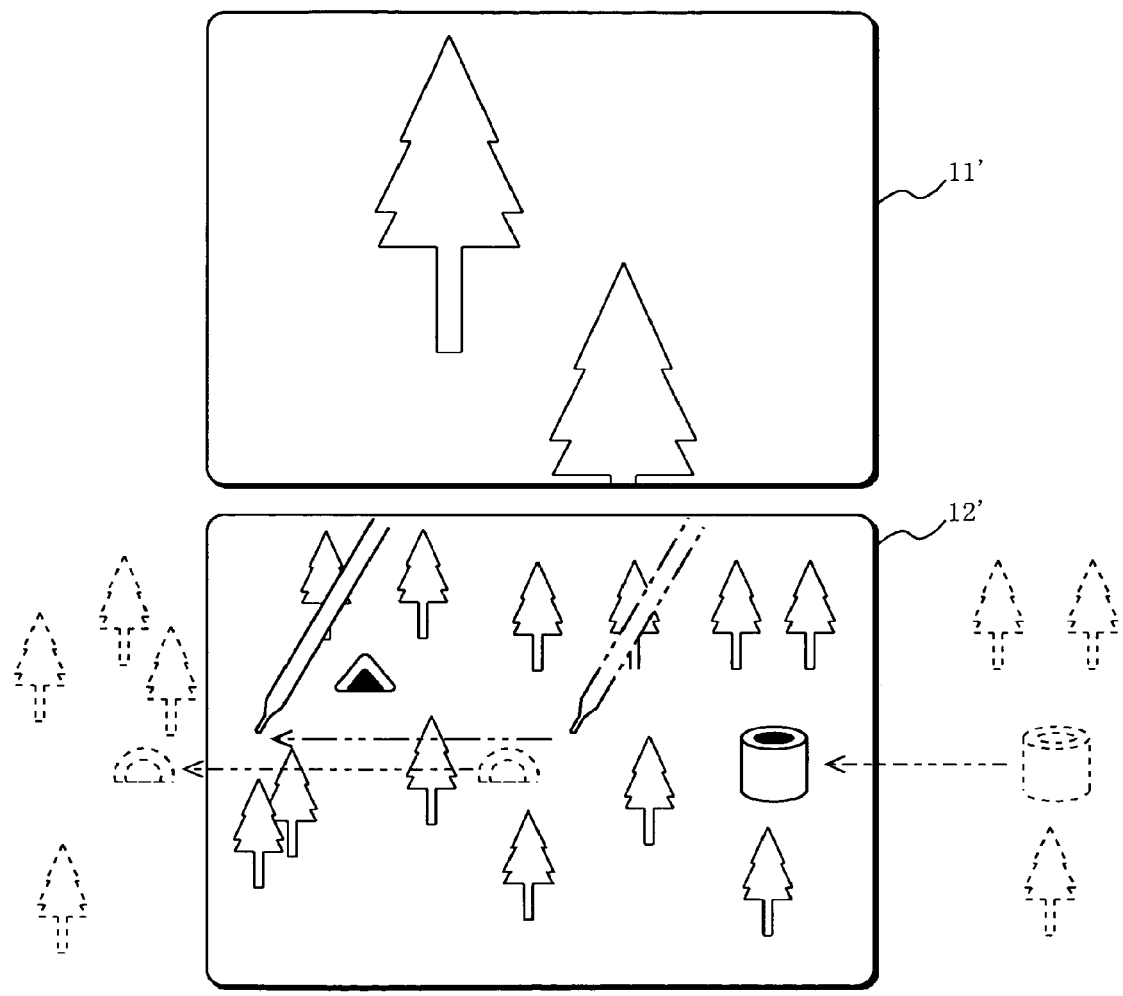
FIG. 7 is a diagram showing exemplary images displayed on the LCD 11 and the LCD 12 in the case where the broad-range map is moved (scrolled)

Next, with reference to FIG. 6 and FIG. 7, an exemplary operation in which the broad-range map image displayed on the LCD 12 is moved (or gradually scrolled) in a designated direction will be described. For example, in order to scroll the broad-range map image displayed on the LCD 12 to the right, the map (MAP) may be moved to the left against the stationary LCD 12. In this case, in order to give a moving instruction to move the broad-range map image shown in FIG. 6 to the right, the player may move the stick 17 to the left on the touch panel 16 (seethe manipulation example of FIG. 7). The coordinate data generated by the touch panel 16 will gradually decrease over time with respect to the x-axis component, while the y-axis component remains constant. If such coordinate data, of which only the x-axis component decreases over time, is input to the manipulation detection section 27, the manipulation detection section 27 detects a moving instruction in the left direction. The manipulation detection section 27 derives a moving amount through coordinate calculations (if necessary), and supplies these results to the map image data change imparting section 28. Based on the coordinate data, of which only the x-axis component gradually changes, the map image data change imparting section 28 generates control data which indicates gradual changes in the basic read address (e.g., coordinates (X1,Yn/2) at time t1; coordinates (X2,Yn/2) at time t2; coordinates (X3,Yn/2) at time t3, and so on), and supplies the generated control data to the broad-range map image data reading section 26. In each of the period between t1 and t2, the period between t2 and t3, the period between t3 and t4, and so on, the broad-range map image data reading section 26 reads one screenful data of a broad-range map image, and supplies the data of the broad-range map image thus read to the display control section 23. As a result, the broad-range map image will be displayed on the LCD 12 so as to gradually scroll to the right, from t1 to t2 and to t3, and so on. Then, after the broad-range map image has been moved by a moving amount (or distance) designated together with the moving direction, the scrolling of the broad-range map image is stopped, after which the same broad-range map image will be continuously displayed.

In the other hand, in order to move the broad-range map image to the left, the stick 17 may be moved to the right so that coordinate data with a gradually increasing x-axis component is generated; thus, the broad-range map image can be moved to the left. In order to move the broad-range map image upwards, the stick 17 may be moved down so that coordinate data with a gradually increasing y-axis component is generated; thus, the broad-range map image can be moved upwards. In order to move the broad-range map image downwards, the stick 17 may be moved up so that coordinate data with a gradually decreasing y-axis component is generated; thus, the broad-range map image can be moved downwards. Furthermore, a moving instruction in an oblique direction may be given, such that coordinate data entailing changes in both the x-axis component and the y-axis component is generated, whereby the broad-range map image can be moved in an oblique direction.

Alternatively, the hand-held game apparatus may be arranged so that the moving direction of the stick 17 and the scrolling direction of the broad-range map image are the same. In this case, the manipulation detection section 27 will reverse the polarity (+, −) of any increase or decrease in the x-axis component and/or the y-axis component when supplying the coordinate data to the map image change imparting section 28.

Although the above example illustrates a case where the player object is not shown in the broad-range map image displayed on the LCD 12, it will be appreciated that a small version of the player object may be displayed on the LCD 12. In this case, the object image data generation section 22 may be imparted with a function of generating a reduced player object (small-size object) by reducing the player object (large-size object) which is displayed on the LCD 11 in accordance with the ratio of reduction of the broad-range map to the narrow-range map, and the display control section 23 may merge the small-size object with the broad-range map image so as to be together displayed on the LCD 12. In this case, the moving velocities of the large-size object displayed on the LCD 11 and the small-size object displayed on the LCD 12 may be adjusted according to the ratio of reduction of the broad-range map to the narrow-range map, so that the large-size object appears to move quicker and that the small-size object appears to move slower, thus establishing synchronization between the two displayed objects.

The block diagram of FIG. 2 illustrates functional blocks of a hand-held game apparatus and a game program according to one exemplary non-limiting illustrative implementation. In more practical exemplary implementations, however, the operation switch manipulation detection section 21, the object image data generation section 22, the display control section 23, the narrow-range map image data reading section 24, the broad-range map image data reading section 25, the touch panel manipulation detection section 27, and the map image change imparting section 28 will be implemented in the form of a game program and a processing circuit (CPU) which executes the game program. Such a practical implementation will be described in detail below.

Figure 8:
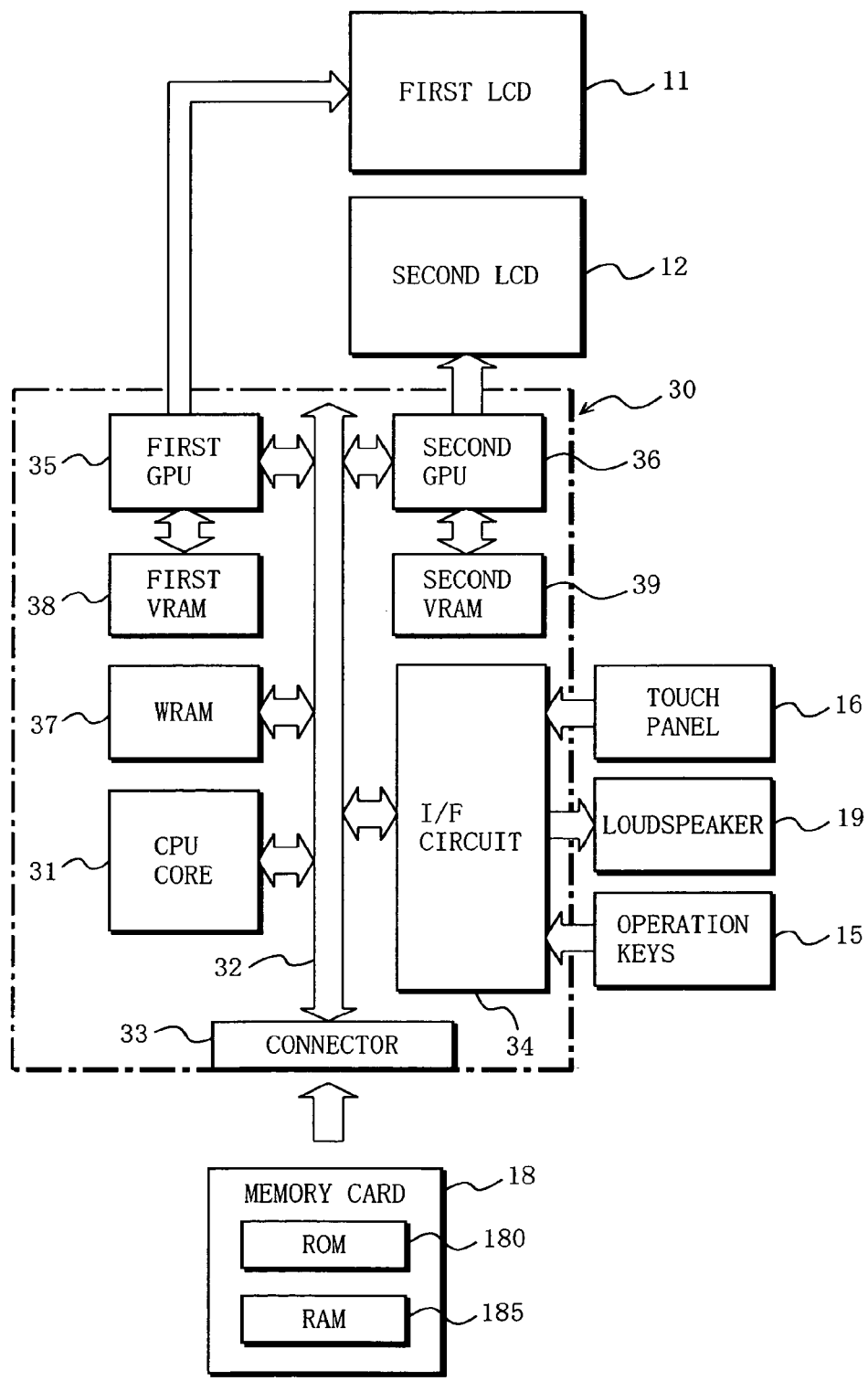
FIG. 8 is a block diagram illustrating a hand-held game apparatus according to another aspect of an exemplary non-limiting illustrative implementation.

FIG. 8 is a block diagram illustrating a hand-held game apparatus according to another exemplary non-limiting illustrative implementation. In FIG. 8, a CPU core 31 is mounted on an electronic circuit board 30 which is accommodated in a housing 13. Via a bus 32, a connector 33, an input/output interface (I/F) circuit 34, a first graphics processing unit (first GPU) 35, a second graphics processing unit (second GPU) 36, and a working RAM (hereinafter referred to as "W-RAM") 37 are connected to the CPU core 31. A memory card 18 is detachably connected to the connector 33. The memory card 18 internalizes a ROM 180 and an S-RAM 185. Backup power from a button battery (not shown) is supplied to the S-RAM 185 in order to prevent the stored data from being destroyed when power supply thereto is stopped as the memory card 18 is detached from the hand-held game apparatus 10. Read from the ROM 180 is controlled by the CPU core 31. Write to and/or read from the S-RAM 185 is controlled by the CPU core 31. An operation switch section 15, a touch panel 16, and a loudspeaker 19 are connected to the I/F circuit 34. The loudspeaker 19 is placed inside a sound hole 14b. A first video RAM (hereinafter referred to as "V-RAM") 38 is connected to the first GPU 35. A second video RAM (hereinafter referred to as "V-RAM") 39 is connected to the second GPU 36.

Based on a program which is stored in the ROM 180, the CPU core 31 reads out one unit of map image data (e.g., the entire map image data corresponding to a given map number, as indicated by "MAP" in FIG. 3), and transfers the map image data to the W-RAM 37. Moreover, from the ROM 180, the CPU core 31 reads a program for controlling the generation of a broad-range map image and a program for controlling the generation of a narrow-range map image, and supplies the former program to the GPU 36 and the latter program to the GPU 35. Then, the GPU 35 performs a read from the W-RAM 37 to generate narrow-range map image data, writes to the V-RAM 38 narrow-range map image data to be displayed as a single screen (i.e., map image data corresponding to the area 11 in FIG. 3) on the LCD 11, and performs a read from the V-RAM 38 with a predetermined timing to cause the narrow-range map image to be displayed on the LCD 11. Concurrently, the GPU 36 performs a read from the W-RAM 37 to generate broad-range map image data, writes to the V-RAM 39 broad-range map image data to be displayed as a single screen (i.e., map image data corresponding to the area 12 in FIG. 3) on the LCD 12, and performs a read with a predetermined timing to cause the broad-range map image to be displayed on the LCD 12.

In the case where the map image data which is set and stored in the ROM 180 (and written to the W-RAM 37) is a narrow-range map images the GPU 35 generates map image data in the same size and writes the generated map image data to the V-RAM 38, and the GPU 36 generates reduced map image data and writes the reduced map image data to the V-RAM 39. On the other hand, in the case where the map image data which is set and stored in the ROM 180 is a broad-range map image, the GPU 36 generates map image data in the same size and writes the generated map image data to the V-RAM 39, and the GPU 35 generates enlarged map image data and writes the enlarged map image data to the V-RAM 38. If increase in the required memory capacity is not a problem (as in the case of using an optical information storage medium instead of a memory card, for example), both the broad-range map image data and the narrow-range map image data may be stored in an external memory.

Figure 9:
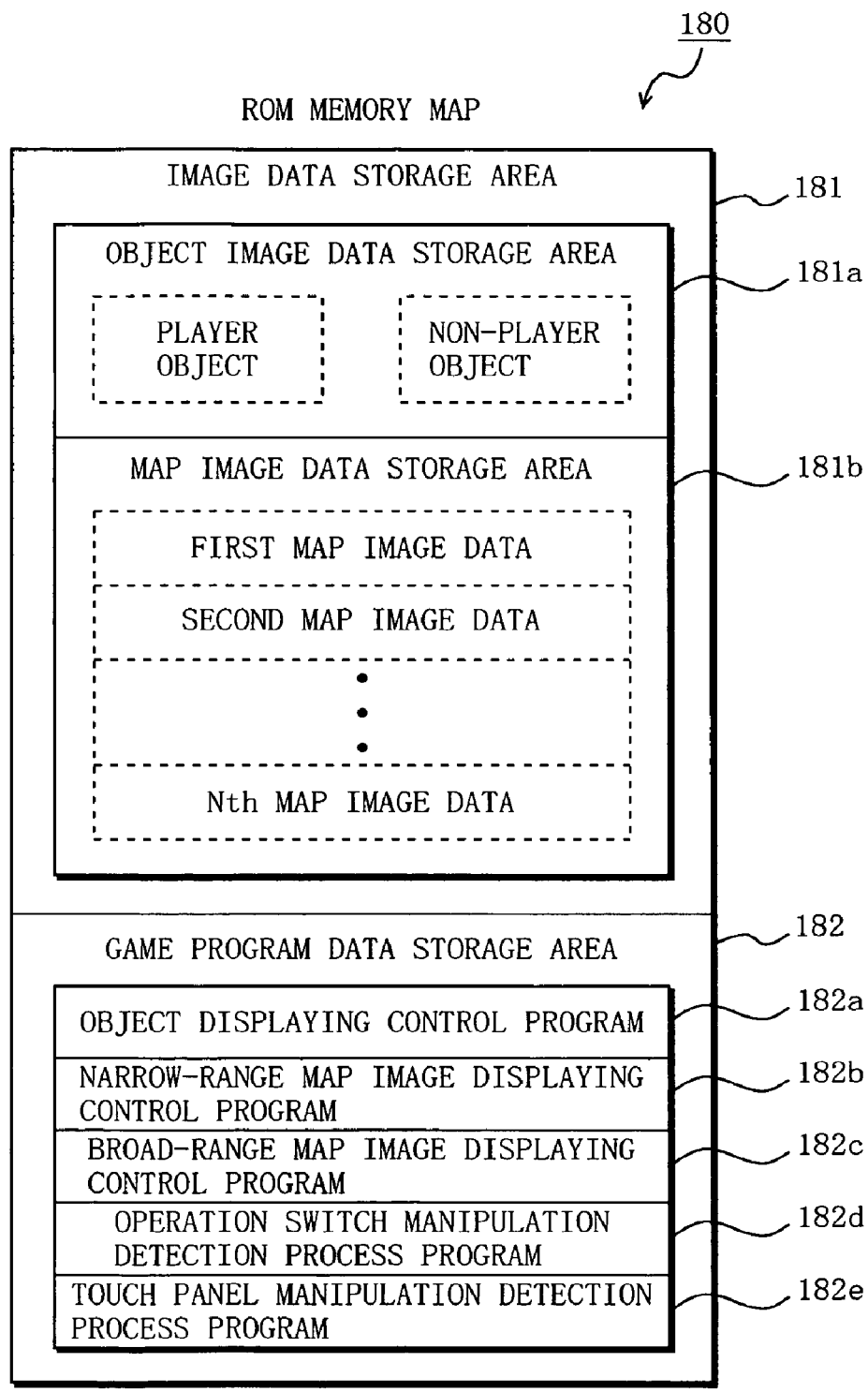
FIG. 9 is a memory map illustrating storage areas in a ROM 180.

FIG. 9 is a memory map illustrating data stored in the ROM 180. In FIG. 9, the ROM 180 generally includes storage areas 181 and 182. The storage area 181, which is a storage area for storing image data, includes a storage area 181a for storing object image data and a storage area 181b for storing map image data. The object image data storage area 181a stores a player object and moving objects other than the player object (i.e., enemy objects and friend objects). The storage area 181b, which is a storage area for storing map image data, stores map image data of each of first to $N^{th}$ maps.

Note that only either one of the narrow-range map image or the broad-range map image needs to be stored in the memory, because the other map image can be generated by enlarging or reducing the stored map image data. In the case where the map image is a three-dimensional image, the map image is generated from a plurality of polygon data for specifying shapes, with a texture (which defines a pattern and/or color) being attached to a shape which is defined by each polygon data. In this case, the broad-range map image and the narrow-range map image may be generated by varying the distance data from an imaginary camera to each polygon, and the generated images may be converted to bitmap image data before being stored to the V-RAMs 38 and 39.

The storage area 182, which is a storage area for storing game program data, includes storage areas 182a, 182b, 182c, 182d, and 182e. The storage area 182a stores an object displaying control program. The storage area 182b stores a narrow-range map image displaying control program. The storage area 182c stores a broad-range map image displaying control program. The narrow-range map image displaying control program and the broad-range map image displaying control program are programs for generating or changing a broad-range map image and a narrow-range map image, respectively, in accordance with the manipulation of the direction switch 15a and/or the manipulation of the touch panel 16.

The storage area 182d stores an operation switch manipulation detection process program. The operation switch manipulation detection process program is a program which detects, for example, up, down, right, or left directions indicated on the direction switch 15a and a moving amount (as determined from the duration for which the indication of a direction is given), or which one of the operation switches 15c and 15e has been pressed, such detection being made for every short predetermined period of time. The storage area 182e stores a touch panel manipulation detection process program. The touch panel manipulation detection process program reads coordinate data which varies in response to the manipulation of the touch panel and temporarily stores the coordinate data for every short predetermined period of time (e.g., a frame), and detects changes in the coordinate data for every long predetermined period of time (e.g., tens to hundreds times the frame period). If the result of the detection indicates that the same (or substantially the same) coordinate data is being repeated, the touch panel manipulation detection process program detects that an instruction to change a displaying coordinate position for the narrow-range map image is being given. On the other hand, if the result of the detection indicates that the coordinate data is changing gradually and continuously, the touch panel manipulation detection process program detects that a moving direction is being designated, based on the amounts of changes in the x-axis component and the y-axis component. Moreover, a moving amount (amount or distance of scroll) may be detected based on a vector amount which combines the amounts of change in both the x-axis component and the y-axis component. The details of the processes to be performed by the respective programs stored in the storage areas 18a to 18e will be described later with reference to FIGS. 10 to 12.

Figure 10:
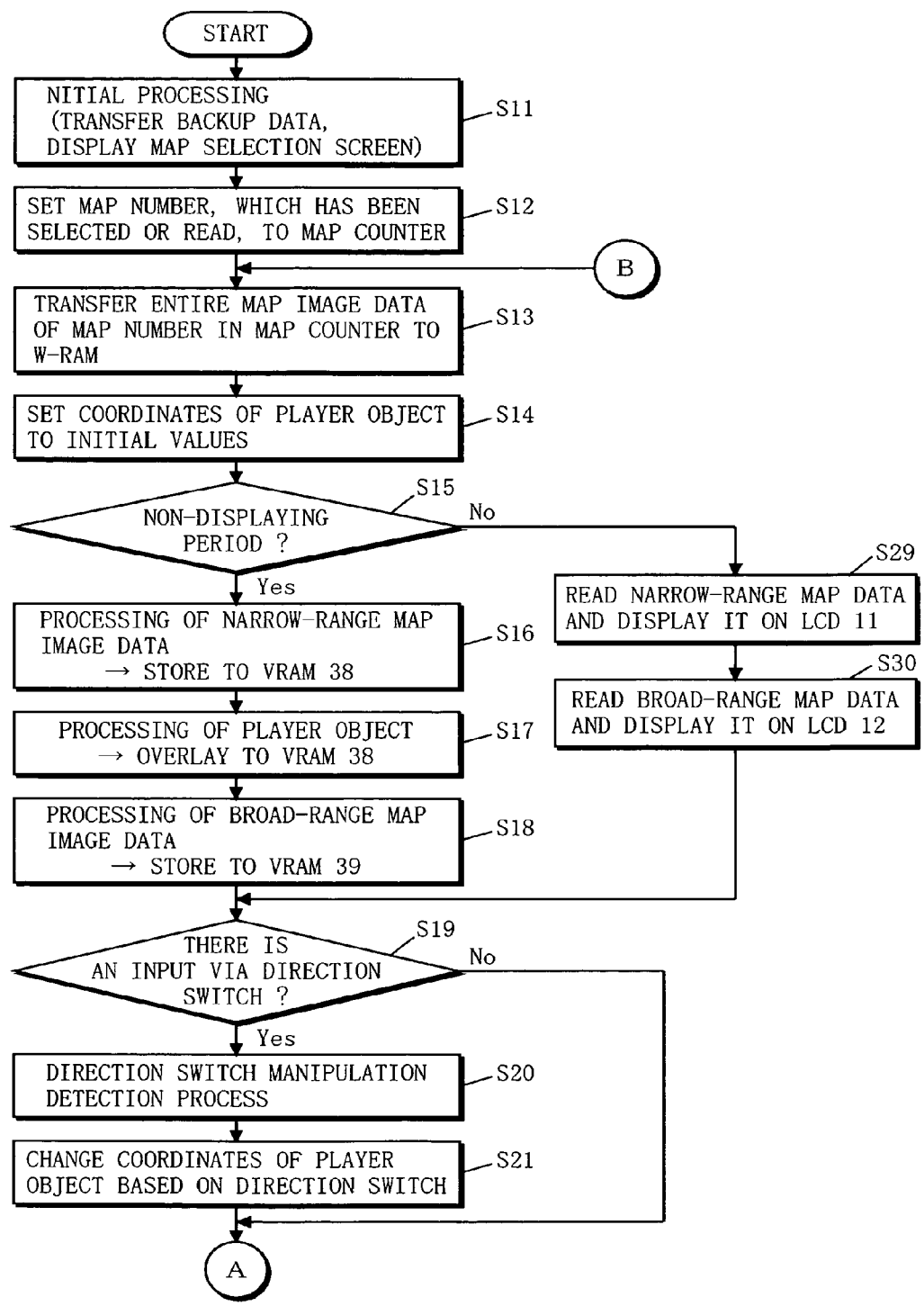
FIG. 10 is a flowchart (former half) of exemplary game software for use with a hand-held game apparatus on which a game is to be played based on a broad-range map and a narrow-range map.
Figure 11:
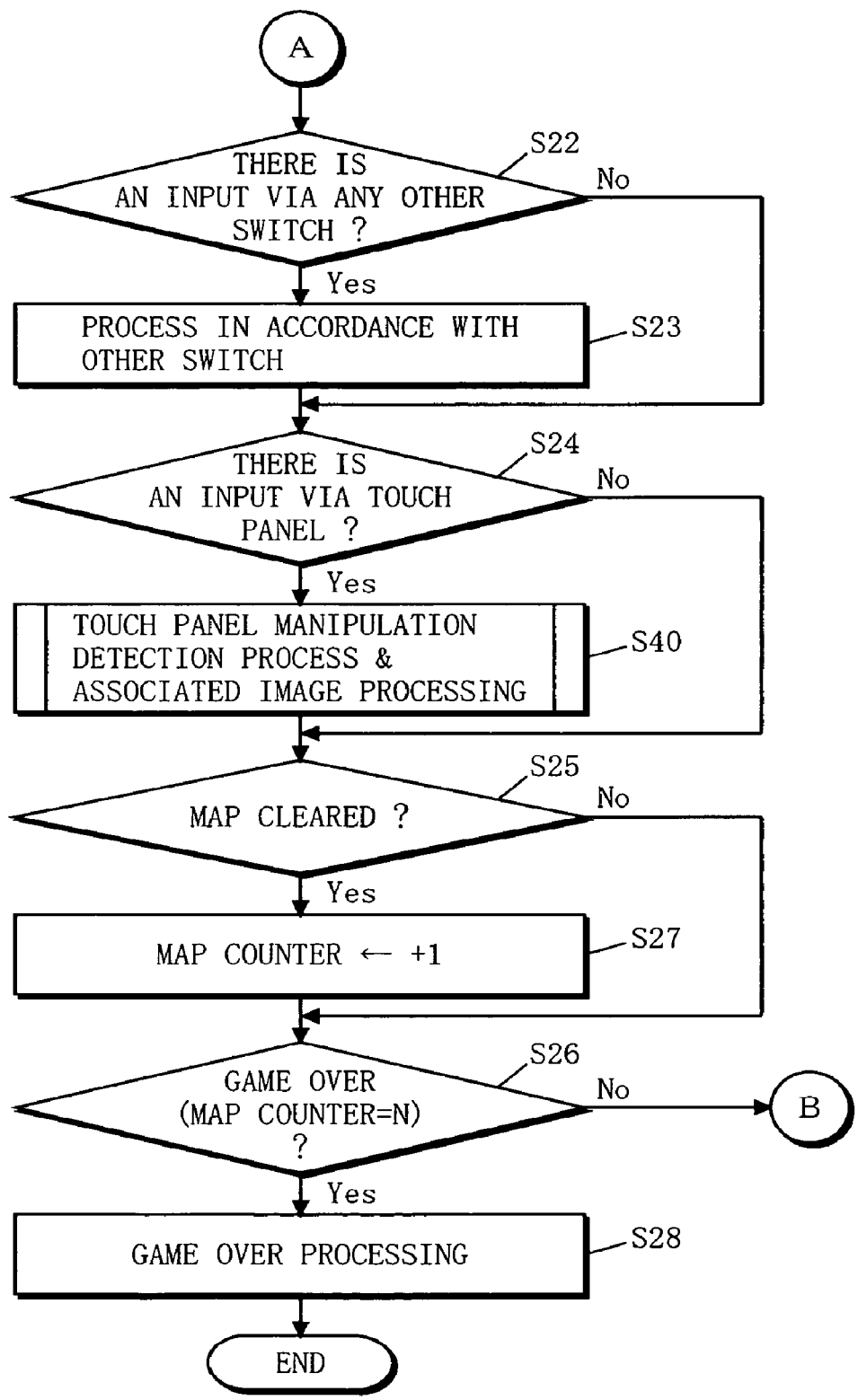
FIG. 11 is a flowchart (former half) of exemplary game software for use with a hand-held game apparatus on which a game is to be played based on a broad-range map and a narrow-range map.
Figure 12:
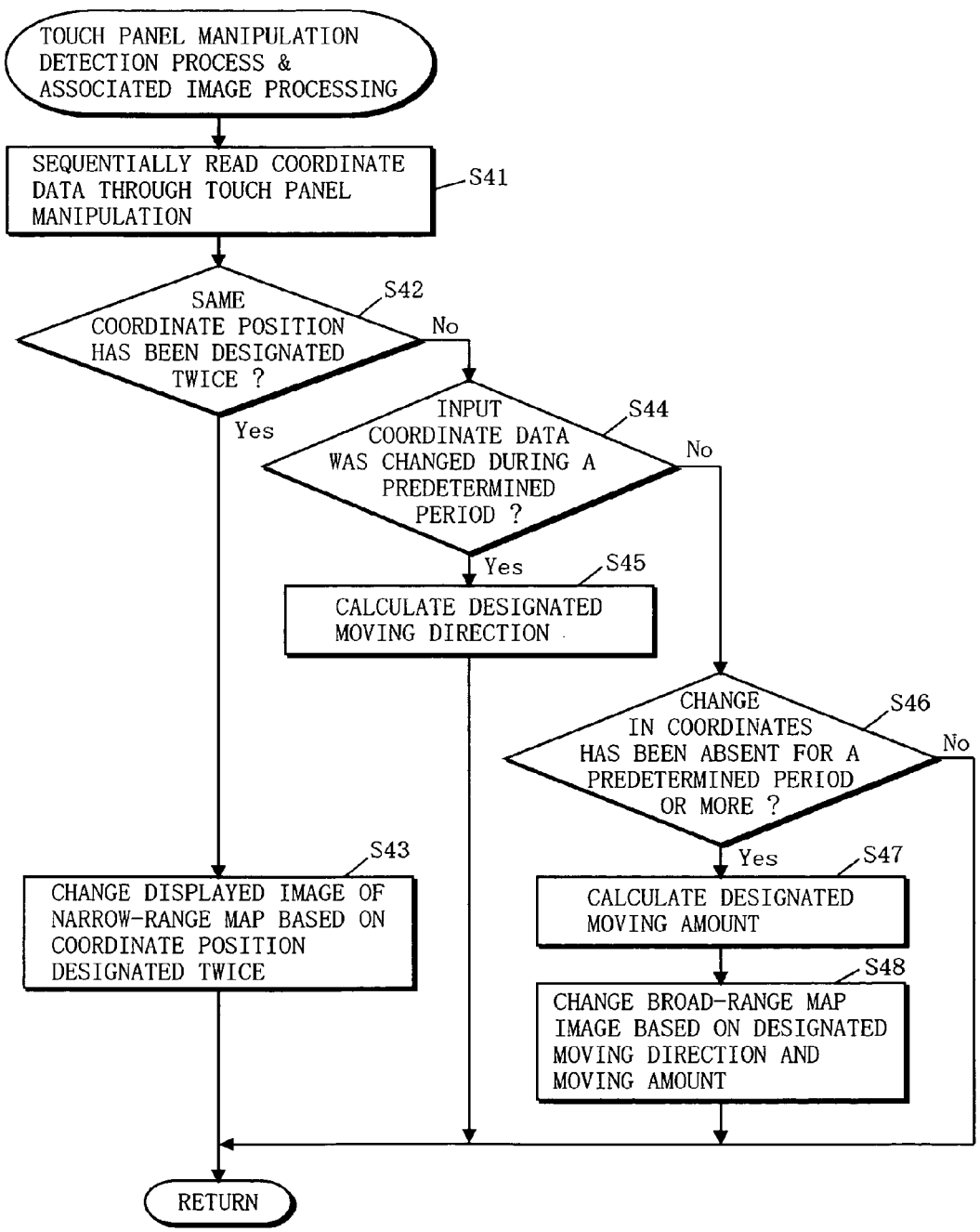
FIG. 12 is a detailed flowchart of a touch panel manipulation detection process and an associated image processing.

FIGS. 10 and 11 are flowcharts of exemplary game software for use with a hand-held game apparatus on which a game is to be played based on a broad-range map and a narrow-range map. FIG. 12 is a detailed flowchart of a touch panel manipulation detection process and an associated image processing. Next, with reference to FIG. 1 and FIGS. 3 to 12, a specific operation according to one exemplary non-limiting illustrative implementation will be described, by also referring to the flowcharts of FIGS. 10 to 12.

Once a power switch (not shown) is activated, the CPU core 31 begins to perform the following processes based on the programs stored in the storage area 182 of the ROM 18. First, at step S11, initial processing is performed, which may proceed as follows, for example. After an initial clear is performed for the W-RAM 37 and the V-RAMS 38 and 39, backup data (which may be, in the case where the game has already been being played, game progress data such as the cleared map numbers, obtained experience points, and obtained items up to the last game play) stored in the reading RAM 185 is read, and written to a backup data storage area (not shown) in the W-RAM 37. Moreover, a selection screen for starting the game play is displayed to allow the player to select whether to begin the game from map number 1 (i.e., the first map) or continue from the map number from the last game play. At step S12, the selected map number (or map number "1" in the case of playing the game anew) is set in a map counter (or a map register, which may be an address in the W-RAM 37, although not shown). Thus, preparatory processing for beginning the game play is performed.

At the next step S13, the entire map image data of the map number which is set in the map counter (e.g., the entire map MAP shown in FIG. 3) is read from the ROM 18, and written to the W-RAM 37. At step S14, the coordinate data of the player object is set to initial values. For example, the coordinates of the upper left corner of the broad-range map image displayed on the LCD 12 may be written to a register (an address in the W-RAM 37) for storing the coordinate position of the player object.

During a non-displaying period, i.e., a period in which the LCD 11 and the LCD 12 do not display images, the processes of steps S15 to S18 are performed. Specifically, it is determined at step S15 whether it is a non-displaying period of the LCD 11 and the LCD 12 now. If it is determined to be a non-displaying period, at step S16, the CPU core 31 and the GPU 35 cooperate to perform processing associated with a narrow-range map image, based on the narrow-range map image displaying control program. Specifically, the CPU core 31 instructs the GPU 35 to set a coordinate position according to initial values. For example, in the exemplary image shown in FIG. 3, in order that a narrow-range map image spanning the area shown by the broken line 11 be displayed on the LCD 11, MAP coordinates (X0,Yn/2) are set so that the coordinates of the upper left corner of the display screen of the LCD 11 become offset values. Then, a narrow-range map image data spanning the displayed area shown by the broken line 11 is read from the W-RAM 37 and supplied to the GPU 35. The GPU 35 enlarges the narrow-range map image data in accordance with the enlargement ratio for the narrow-range map so that the narrow-range map image will occupy the screen size of the LCD 11, and writes the enlarged narrow-range map image data to the V-RAM 38, thus temporarily storing the enlarged narrow-range map image data. At step S17, processing associated with moving objects (including the player object and the non-player objects) is performed, whereby the image data of the moving objects is written over the narrow-range map image data stored in the V-RAM 38. As a result, an image combing the narrow-range map image and the moving object images is now stored in the V-RAM 38. In the case where priority levels can be assigned to the map image and the moving objects (or any number of dots thereof), any image data to be displayed at the same coordinates (or dot) will be stored in the V-RAM 38 in such a manner that, based on priority data (or Z value data), the image data having a higher priority is written over the image data having a lower priority. As a result, the higher-priority image will be displayed on the LCD 11 so as to appear as overlaying the lower-priority image.

At the next step S18, based on the broad-range map image displaying control program, the CPU core 31 and the GPU 36 cooperate to perform processing associated with the broad-range map image.

Specifically, the CPU core 31 instructs the GPU 36 to set a coordinate position according to initial values. For example, in the exemplary image shown in FIG. 3, in order that a broad-range map image spanning the area shown by the broken line 12 be displayed on the LCD 12, MAP coordinates (X0,Yn/2) are set so that the coordinates of the upper left corner of the display screen of the LCD 12 become offset values. Then, a broad-range map image data spanning the displayed area shown by the broken line 12 is read from the W-RAM 37 and supplied to the GPU 36. The GPU 36 writes the broad-range map image data to the V-RAM 39, thus temporarily storing the broad-range map image data.

In the case where a small-size player object is to be displayed on the LCD 12, it will be appreciated that a process of generating a small-size object in accordance with the reduction ratio for the map size, as well as an overlaying process therefor, are to be performed between step S17 and step S18.

At step S19, it is determined whether an input has been made by means of the direction switch 15a. If it is determined that such an input has been made, control proceeds to step S20. On the other hand, if it is determined that no such input has been made, control proceeds to step S22. If an input has been made by means of the direction switch 15a, step S20 executes a process of detecting the manipulation performed for the direction switch 15a. For example, if any one of the "up", "down", "right", or "left" direction of the direction switch 15a has been pressed, a key code corresponding to that direction is read and temporarily stored to an internal register (not shown). At step S21, a process of changing the current coordinate position of the player object based on the manipulation of the direction switch 15a is performed. At step S22, it is determined whether an input has been made by means of any other operation switches 15b to 15f. If it is determined an input has been made by means of any one of the operation switches 15b to 15f, an input processing based on that switch is performed at step S23. After step S23, or if step S22 finds that no input has been made by means of the operation switches 15b to 15f, control proceeds to step S24. Thus, processes based on the manipulations of the direction switch 15a and any other operation switches 15b to 15f are performed.

At step S24, it is determined whether an input of coordinates has been made through manipulation of the touch panel 16. If an input of coordinates has been made through manipulation of the touch panel 16, the subroutine process of step S40, i.e., a touch panel manipulation detection process and an associated image processing based on the detection (see FIG. 12), is performed, whose details will be described later.

At step S25, it is determined whether a map clear condition has been met. If it is determined that the map has not been cleared, step S26 then determines whether the game is over. The game over determination of step S26 is based on whether the count value of the map counter has reached the largest map number (N) or whether a game over condition (e.g., the hit points or life of the player having reached "0") has been met. If step S25 finds that the map clear condition has not been met and if step S26 finds that the game over condition has not been met either, control returns to the aforementioned step S13, so that the processes from steps S13 to S26 and steps S29 and S30 (described later) will be repeated with a certain periodicity.

On the other hand, if step S15 finds that it is not a non-displaying period of the LCD 11 and the LCD 12 (that is, it is a displaying period), control proceeds to step S29. At step S29, the CPU 35 performs a read from the V-RAM 38 at a display timing of the LCD 11, so that narrow-range map image data is sequentially read during one frame period in synchronization with frame scanning, whereby the narrow-range map image is displayed on the LCD 11. Also, at step S30, the CPU 36 performs a read from the V-RAM 39 at a display timing of the LCD 12, so that broad-range map image data is sequentially read during one frame period in synchronization with frame scanning, whereby the broad-range map image is displayed on the LCD 12.

Thus, an image combining the narrow-range map image and the moving objects is displayed on the LCD 11, whereas the broad-range map image is displayed on the LCD 12.

Next, with reference to FIG. 12, the subroutine process of a touch panel manipulation detection process and an associated image processing based on the detection will be described. At step S41, coordinate data acquired through manipulation of the touch panel is read, and written to a register (an address of the W-RAM 37). At step S42, it is determined whether the same coordinate position has been designated twice. For example, if a set of coordinates in the neighborhood of the cave located in a lower left portion of FIG. 3 has been designated twice, it is determined that the same coordinate position has been designated twice, and control proceeds to step S43, where a process of changing the narrow-range map based on the coordinate position which has been designated twice is performed. In other words, in order to display a narrow-range map as delineated by the solid line which lies to the lower right of the narrow-range map (enlarged map) delineated by the broken line in FIG. 3, image data of a narrow-range map which is centered around a coordinate position near the cave is read from the W-RAM 37, and written to the V-RAM 38. Thereafter, control returns to step S25. Then, when the processes of steps S13 to S19 are performed during a displaying period for the next frame, the narrow-range map image data which has been updated at step S29 is read by the GPU 35, whereby the narrow-range map image as shown in the upper half of FIG. 5 is displayed on the LCD 11.

If the manipulation of the touch panel 16 does not—designation the same coordinate position as before, but rather is an instruction of a moving direction as indicated by moving the stick 17, step S42 determines that the same coordinate position has not been designated twice, and control proceeds to step S44. At step S44, it is determined whether the input coordinate data has been changed during a predetermined period of time. If it is determined that the input coordinate data has been changed during a predetermined period of time, step S45 calculates the moving direction which has been designed. This process of calculating the moving direction is, for example, a process of deriving a tilt (angle) from the amounts of changes in the x-axis component and the y-axis component. Thereafter, control returns to step S25. In general, during the instruction of a moving direction, steps S13 to S26 and S41 to S45 are repeated a number of times, while gradually changing coordinate data are sequentially detected, and, once the stick 17 has been moved by a desired distance, the player takes the stick 17 off the screen of the LCD 12. Therefore, at one point during the repetitions of steps S13 to S26 and S41 to S45, absence of changes in the input coordinates for a predetermined period of time is detected, and then control proceeds to step S46. At step S46, absence of input coordinates as well as absence of changes in the coordinates for a predetermined period of time longer than the period of time at step S44 are detected, after which control proceeds to step S47. At step S47, a process of calculating the moving direction (or distance), which has been designated, is performed. This process is a process of calculating a vector amount, during a period since the coordinates of the stick 17 were first detected, after which a change in the designated coordinates is detected, until a relatively long absence of changes in the input coordinates is detected; the vector amount is calculated between the initially-designated coordinate position and the coordinate position immediately before the change in the input coordinates becomes undetectable. At the next step S48, a process of gradually changing the broad-range map image, so as to gradually move in the designated moving direction by the calculated moving amount, is performed. Thus, as shown in FIG. 6, a map image which has been moved (scrolled) in the direction and by the moving amount as designated through the manipulation of the touch panel 16 is displayed on the LCD 12.

Thus, the player is able to play the game while watching either one or both of the narrow-range map image and the broad-range map image depending on the situation. The player can also manipulate, to his or her own advantage, the touch panel 17 to change displayed coordinates (or displayed area) for the narrow-range map image, or scroll the broad-range map image.

On the other hand, if step S25 finds that the map clear condition has been met, the count value of the map counter is incremented by one at step S27. Then, unless step S26 finds that the game over condition has been met, control returns to step S13 to repeat a similar flow to that described above, so that displaying processes for map images corresponding to the next map number (i.e., processes of steps S13 to S26 and S41 to S48) are performed.

If step S26 finds that the game over condition has been met, control proceeds to step S28, where game over processing is performed. In the game over processing, data indicating the game progress which is stored in the W-RAM 37 (e.g. the cleared map numbers, obtained experience points, hit points, life, obtained items, and various other data) is read by the CPU core 31, and written to the RAM 185 of the memory card 18. Thus, the entire game processing operation is completed.

Figure 13:
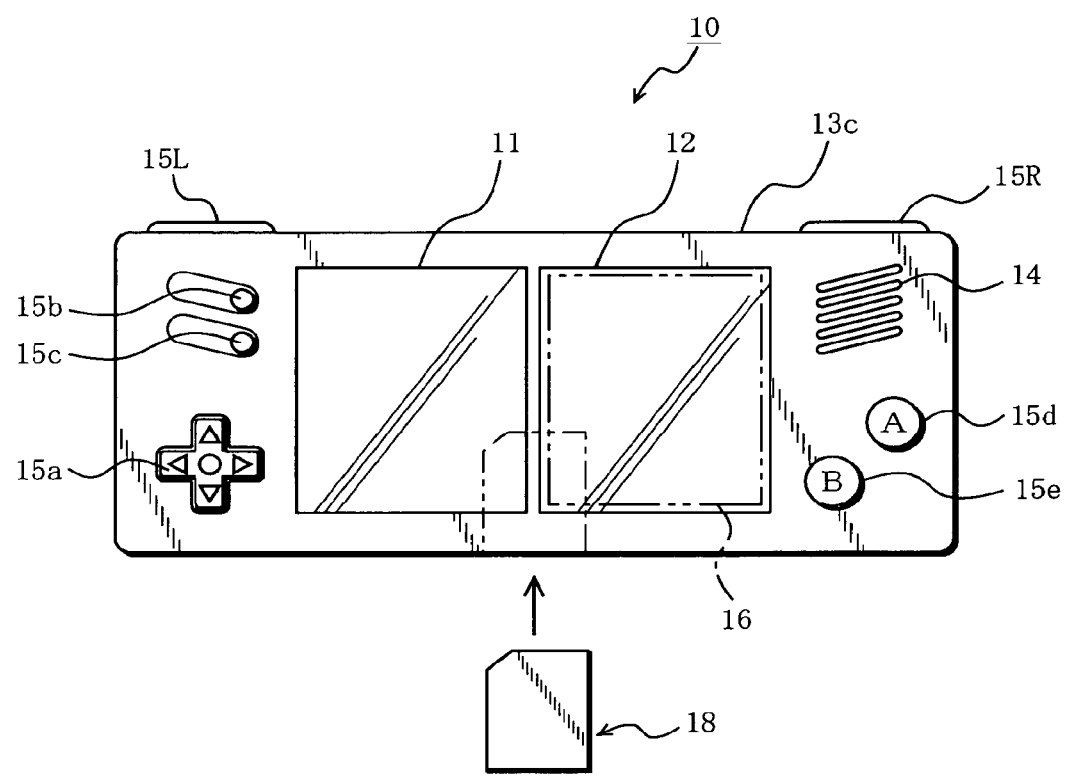
FIG. 13 is a view showing the outer look of a hand-held game apparatus according to another aspect of an exemplary non-limiting illustrative implementation (where liquid crystal display sections embodying two screens are disposed side by side)

The above non-limiting implementations illustrate examples where two physically separate LCDs 11 and 12 are disposed one on top of the other (i.e., two vertically-arranged screens) as liquid crystal display sections embodying two screens. Alternatively, as shown in FIG. 13, a single housing 13c which is elongated along the horizontal direction may be used, while omitting the upper housing 13a, so that the LCDs 11 and 12 embodying two screens are accommodated side by side in the housing 13c. Since it is likely that there are more right-handed users than left-handed users, the LCD 12 having the touch panel 16 mounted thereon is preferably located on the right side, whereas the LCD 11 is located on the left side. Of course, an opposite structure may be adopted in the case of producing a hand-held game apparatus for left-handed users.

Figure 14:
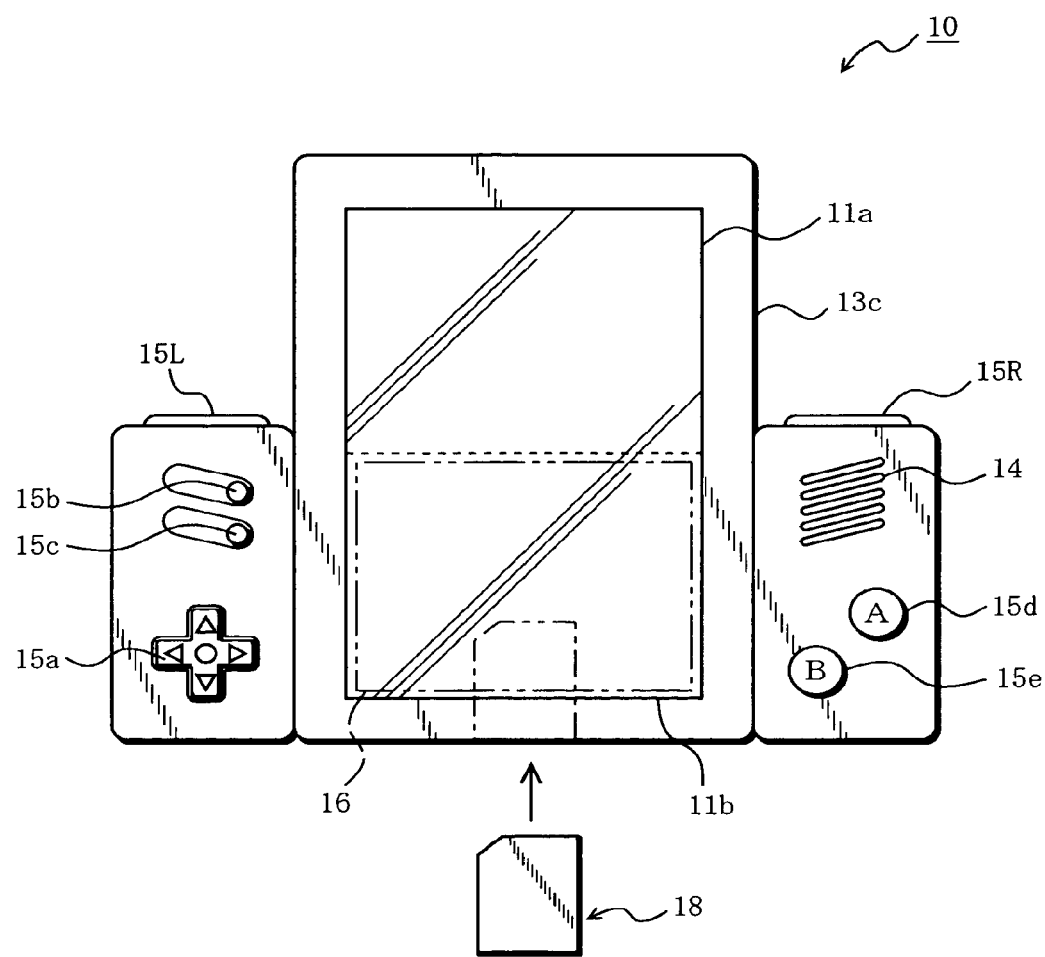
FIG. 14 is a view showing the outer look of a hand-held game apparatus according to still another aspect of an exemplary non-limiting illustrative implementation (using a single liquid crystal display device to realize liquid crystal display sections embodying two screens, which are disposed one on top of the other)
Figure 15:
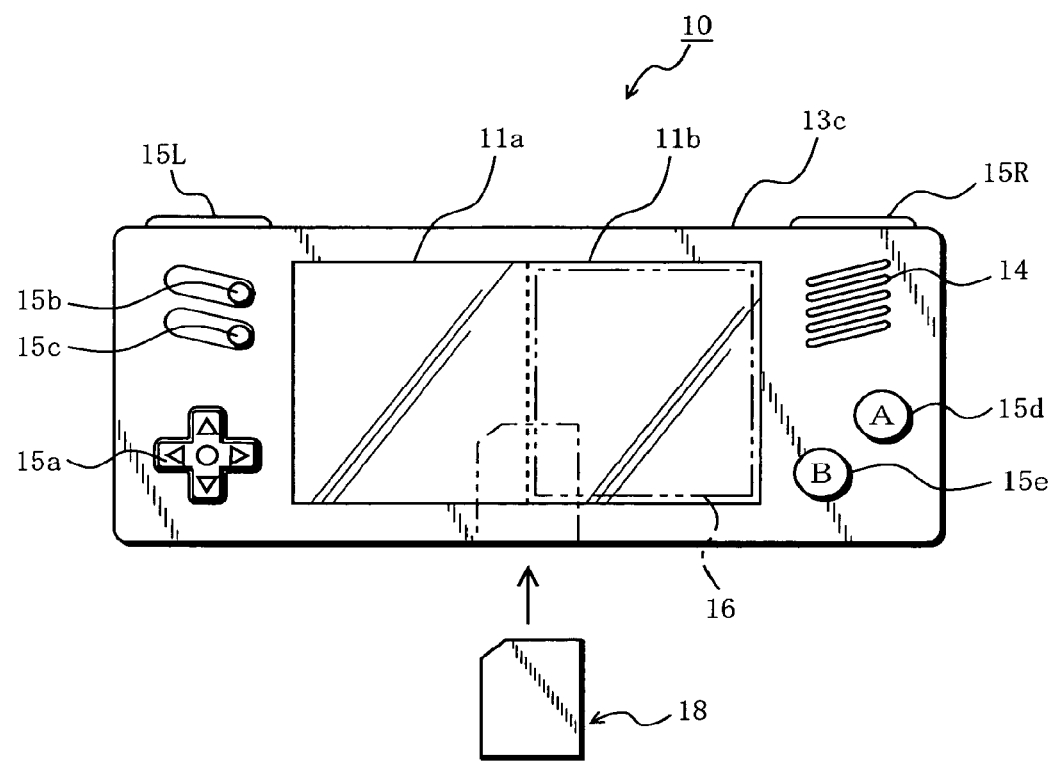
FIG. 15 is a view showing the outer look of a hand-held game apparatus according to still another aspect of an exemplary non-limiting illustrative implementation (using a single liquid crystal display device to realize liquid crystal display sections embodying two screens, which are disposed side by side).

As a further alternative to employing two physically separate LCDs 11 and 12 which are disposed one on top of the other, a structure as shown in FIG. 14 may be adopted, which employs only one LCD. The LCD shown in FIG. 14 has the same horizontal dimension as that of the above-described LCDs 11 and 12, but has a vertical dimension which is twice as long as its horizontal dimension, so as to be capable of displaying two screens on one top of the other. Thus, the physically single LCD can provide liquid crystal display sections embodying two screens, on which two map images can be displayed on one top of the other, without any physical separation between the upper and lower screens. Similarly, as shown in FIG. 15, an LCD may be employed which has the same vertical dimension as that of the above-described LCDs 11 and 12, but has a horizontal dimension which is twice as long as its vertical dimension. Such an LCD is capable of displaying two map images side by side along the lateral direction, without any physical separation between the right and left screens.

Although the above exemplary implementations illustrate examples where the touch panel 16 is mounted on only one screen, i.e., the LCD 12, the touch panel 16 may be mounted on both liquid crystal display sections (LCDs 11 and 12), so as to provide two screens which are equipped with the touch panel 16.

While the technology herein has been described in connection with exemplary illustrative non-limiting implementations, the invention is not to be limited by the disclosure. It is understood that numerous other modifications and variations can be devised without departing from the scope of the invention.

What is claimed is:

1. A hand-held game apparatus comprising:
    a memory device which stores a virtual game map image;
    a first liquid crystal display section which displays a first game picture including a partial range of the virtual game map image;
    a second liquid crystal display section, located near the first liquid crystal display section, which displays a second game picture including, out of the virtual game map image, a broader range than does the partial range displayed on the first liquid crystal display section;
    a housing which accommodates the first liquid crystal display section and the second liquid crystal display section in predetermined positions;
    a touch panel, mounted at least correspondingly to the second liquid crystal display section, which outputs coordinate data when the touch panel is manipulated, the coordinate data indicating a manipulated position on a display surface of the second liquid crystal display section;
    a manipulation detector circuit which at least detects a designated moving direction in accordance with a change in a designated coordinate position, based on the coordinate data output from the touch panel;
    a first map image data generating circuit which, based on a game program, generates, from the virtual game map image, narrow-range map image data for causing the first liquid crystal display section to display a narrow-range map image, which represents a relatively narrow range out of the virtual game map image;
    a second map image data generating circuit which, based on the game program, generates, from the virtual game map image, broad-range map image data for causing the second liquid crystal display section to display a broad-range map image, which represents a relatively broad range out of the virtual game map image;
    a map image data change logic which, in response to an instruction of a moving direction as detected by the manipulation detector circuit on the broad-range map image, changes the broad-range map image data generated by the second map image data generating circuit, and changes the narrow-range map image data generated by the first map image data generating circuit; and
    a display controller which controls the first liquid crystal display section to display as the first game picture the narrow-range map image based on the narrow-range map image data generated by the first map image data generating circuit or changed by the map image change logic, and controls the second liquid crystal display section to display as the second game picture the broad-range map image based on the broad-range map image data generated by the second map image data generating circuit or changed by the map image change logic,
    wherein the virtual game map image is larger than the broad-range map image, said narrow-range map image comprising a magnified portion of said broad-range map image viewed from the same direction as the broad-range map image, said map image data change logic causing said displayed broad-range map image to scroll in said designated moving direction through said virtual game map image and thereby reveal different portions of the virtual game map image, said map image data change logic causing said narrow-range map to scroll with said broad-range map image so that said narrow-range map image during scrolling comprises a portion of said broad-range map image.

2. The hand-held game apparatus according to claim 1, wherein,
    the manipulation detector circuit further detects the designated coordinate position based on a manipulation of the touch panel, and
    the map image data change logic changes, in response to the manipulation detector detecting the designated coordinate position, the narrow-range map image data generated by the first map image data generating circuit so as to represent an enlarged narrow-range map image around the designated coordinate position,
    the display controller controls the first liquid crystal display section to display as the first game picture the narrow-range map image data having been moved by the map image data change logic.

3. The hand-held game apparatus according to claim 1, further including an object image data generating circuit which generates object image data for causing at least one liquid crystal display section to display an object belonging to the game, wherein
    the object image data generating circuit generates at least one of a large-size player object image data for causing the first liquid crystal display section to display a large-size player object and small-size player object image data for causing the second liquid crystal display section to display a small-size player object, and
    the display controller is operable to control at least one of:
    the first liquid crystal display section to display the narrow-range map image based on the narrow-range map image data having been changed by the map image data change logic, together with a large-size player object image based on the large-size player object image data generated by the object image data generating circuit, the large-size player object image is superposed on the narrow-range map image, and
    the second liquid crystal display section to display the broad-range map image based on the broad-range map image data having been changed by the map image data change logic together with a small-size player object image based on the small-size player object image data generated by the object image data generating circuit, the small-size player object image is superposed on the broad-range map image, thus causing the changed narrow-range map image and the changed broad-range map image to be displayed.

4. A hand-held game apparatus according to claim 1, wherein,
    the map image data change logic is operable to:
    change, in accordance with the designated coordinate position as detected by the manipulation detector circuit on the broad-range map image displayed by the second liquid crystal display section, the narrow-range map image data generated by the map image display engine so as to represent a narrow-range map image around the designated coordinate position, and
    the manipulation detector circuit, when the coordinate data indicates that a coordinate position on the broad-range map image is inputted a plurality of times, detects the coordinate position as the designated coordinate position and when the coordinate data indicates that an input is performed such that a coordinate position on the broad-range map image is continuously changed, detects a direction, in which the coordinate position is changed, as the designated moving direction.

5. The game apparatus of claim 1, wherein said apparatus further comprises an animation generator that generates at least one animated game character that a human player can move about the broad-range map with the touch panel.

6. The game apparatus of claim 1, wherein said narrow-range map image provides a window into said broad-range map image and said broad-range map provides a window into the virtual game map image.

7. A non-transitory computer-readable storage medium storing a game program for use with a hand-held game apparatus comprising: a memory device which stores a virtual game map image; a first liquid crystal display section which displays a first game picture including a partial range of the virtual game map image; a second liquid crystal display section, located near the first liquid crystal display section, which displays a second game picture including, out of the virtual game map image, a broader range than does the partial range map displayed on the first liquid crystal display section; a housing which accommodates the first liquid crystal display section and the second liquid crystal display section in predetermined positions; a touch panel, mounted at least correspondingly to the second liquid crystal display section, which outputs coordinate data when the touch panel is manipulated, the coordinate data indicating a manipulated position on a display surface of the second liquid crystal display section; and a computer, the game program causing the computer to execute:

manipulation detection which at least detects a moving direction in accordance with a change in a designated coordinate position, based on the coordinate data output from the touch panel;

first map image data generation which generates, from the virtual game map image, based on a game program, narrow-range map image data for causing the first liquid crystal display section to display a narrow-range map image, which represents a relatively narrow range out of the virtual game map image;

second map image data generation which generates, from the virtual game map image, based on the game program, broad-range map image data for causing the second liquid crystal display section to display a broad-range map image, which represents a relatively broad range out of the virtual game map image;

map image data change imparting which changes, in response to an instruction of a moving direction as detected by the manipulation detection on the broad-range map image, the narrow-range map image data generated by the second map image data generation, and changes the narrow-range map image data generated by the first map image data generating circuit;

display control which controls the first liquid crystal display section to display as the first game picture the narrow-range map image based on the narrow-range map image data generated by the first map image data generation or changed by the map image change logic, and controlling the second liquid crystal display section to display as the second game picture the broad-range map image based on the broad-range map image data generated by the second map image data generation or changed by the map image change imparting, and wherein the virtual game map image is larger than the broad-range map image, said narrow-range map image comprising a magnified portion of said broad-range map image viewed from the same direction as the broad-range map image, said map image data change logic causing said displayed broad-range map image to scroll in said designated moving direction through said virtual game map image and thereby reveal different portions of the virtual game map image, said map image data change logic causing said narrow-range map to scroll with said broad-range map image so that said narrow-range map image during scrolling comprises a portion of said broad-range map image.

8. A hand-held game apparatus comprising:

a memory device which stores a virtual game map image;

a first liquid crystal display section which displays a first game picture including a partial range of the virtual game map image;

a second liquid crystal display section, located near the first liquid crystal display section, which displays a second game picture including, out of the virtual game map image, a broader range than does the partial range displayed on the first liquid crystal display section;

a housing which accommodates the first liquid crystal display section and the second liquid crystal display section in predetermined positions;

a touch panel, mounted at least correspondingly to the second liquid crystal display section, which outputs coordinate data when the touch panel is manipulated, the coordinate data indicating a manipulated position on a display surface of the second liquid crystal display section;

a manipulation detector circuit which at least detects a designate moving direction in accordance with a change in a designated coordinate position based on the coordinate data output from the touch panel;

a first map image data generating circuit which, based on a game program, generates, from the virtual game map image, narrow-range map image data for causing the first liquid crystal display section to display a narrow-range map image, which represents a relatively narrow range out of the virtual game map image;

a second map image data generating circuit which, based on the game program, generates, from the virtual game map image, broad-range map image data for causing the second liquid crystal display section to display a broad-range map image, which represents a relatively broad range out of the virtual game map image;

a map image data change logic which, in response to an instruction of a moving direction as detected by the manipulation detector circuit on the broad-range map image, changes the broad-range map image data generated by the second map image data generating circuit, and changes the narrow-range map image data generated by the first map image data generating circuit; and a display controller which controls the first liquid crystal display section to display as the first game picture the narrow-range map image based on the narrow-range map image data generated by the first map image data generating circuit or changed by the map image change logic, and controls the second liquid crystal display section to display as the second game picture the broad-range map image based on the broad-range map image data generated by the second map image data generating circuit or changed by the map image change logic, wherein the virtual game map image is larger than the broad-range map image, said narrow-range map image comprising a magnified portion of said broad-range map image viewed from the same direction as the broad-range map image, said map image data change logic causing said displayed broad-range map image to shift in said designated moving direction through said virtual game map image and thereby reveal different portions of the virtual game map image, said map image data change logic causing said narrow-range map to shift with said broad-range map image so that said narrow-range map image during scrolling comprises a portion of said broad-range map image.

* * * * *